US007513155B2

(12) United States Patent
Jeong et al.

(10) Patent No.: US 7,513,155 B2
(45) Date of Patent: Apr. 7, 2009

(54) INERTIAL SENSOR

(75) Inventors: Heewon Jeong, Tokyo (JP); Hiroshi Fukuda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 330 days.

(21) Appl. No.: 11/566,399

(22) Filed: Dec. 4, 2006

(65) Prior Publication Data

US 2007/0131030 A1 Jun. 14, 2007

(30) Foreign Application Priority Data

Dec. 5, 2005 (JP) ............................. 2005-350832

(51) Int. Cl.
*G01C 19/00* (2006.01)
(52) U.S. Cl. .............. 73/504.02; 73/504.04; 73/504.12; 73/510
(58) Field of Classification Search .............. 73/504.12, 73/504.14, 510, 504.13, 504.02, 504.03, 73/504.04, 511; 74/5 R; 324/162; 340/669
See application file for complete search history.

(56) References Cited

U.S. PATENT DOCUMENTS

| 5,216,315 | A * | 6/1993 | Terada et al. ................ 310/329 |
| 6,311,555 | B1 * | 11/2001 | McCall et al. ................ 73/488 |
| 6,584,840 | B2 * | 7/2003 | Tsugai et al. ............ 73/504.09 |
| 6,691,571 | B2 | 2/2004 | Willig et al. |
| 7,091,715 | B2 * | 8/2006 | Nemirovsky et al. ...... 324/158.1 |
| 7,337,669 | B2 * | 3/2008 | Nozoe ...................... 73/514.16 |
| 2002/0139187 | A1 * | 10/2002 | Tsugai et al. ............ 73/504.09 |
| 2005/0072233 | A1 * | 4/2005 | Nozoe ...................... 73/514.16 |

FOREIGN PATENT DOCUMENTS

| JP | 7-218268 | 8/1995 |
| JP | 3077077 | 6/2000 |
| JP | 2002-081939 | 3/2002 |
| JP | 2004-518969 | 6/2004 |
| JP | 3589182 | 8/2004 |

OTHER PUBLICATIONS

"Design, Simulation, and Implementation of Two Novel Micromechanical Vibratory-Rate Gyroscopes" by Michael Kranz et al, master's thesis of USA Carnegie Mellon University, May 1998.

* cited by examiner

*Primary Examiner*—Hezron Williams
*Assistant Examiner*—Samir M Shah
(74) *Attorney, Agent, or Firm*—Mattingly, Stanger, Malur & Brundidge, P.C.

(57) ABSTRACT

Four sensor units (SUA1 to SUA4) are disposed symmetrically about a point, on both top and bottom and left and right centering around one point of a support (15e). Furthermore, four sensor units (SUA1 to SUA4) are designed so that all the components are fully in tuning-fork structure. Drive frames (5, 5) of the sensor units (SUA1, SUA2) disposed adjacent to each other in a first direction (Y) are vibrated in mutually inverted phases, and drive frames of the other sensor units (SUA3, SUA4) disposed adjacent to each other in a second direction (X) are vibrated in mutually inverted phases as well. Moreover, the drive frames of the sensor units (SUA1, SUA2) and the drive frames of the other sensor units (SUA3, SUA4) are operated in synchronization in the state in which phases are shifted by 90 degrees. Whereby, it is possible to reduce or prevent vibration coupling in the driving direction and in the detection direction, and the leakage (loss) of excitation energy and Coriolis force. Thereby, performance of an inertial sensor is improved.

20 Claims, 17 Drawing Sheets

INERTIAL SENSOR

CROSS-REFERENCE TO RELATED APPLICATION

The present application claims priority from Japanese Patent Application No. JP 2005-350832 filed on Dec. 5, 2005, the content of which is hereby incorporated by reference into this application.

TECHNICAL FIELD OF THE INVENTION

The present invention relates to an inertial sensor technology and, more particularly, relates to an art that is effectively applied to an MEMS inertial sensor manufactured by MEMS (Micro Electro Mechanical Systems) technology.

BACKGROUND OF THE INVENTION

One example of an inertial sensor the present inventors take into consideration is shown in FIG. 19. In this inertial sensor, a mass 500 is fixed to a basement layer by supports 503 via beams 501, 502. The mass 500 is vibrated in the X-direction by driving means 504, and when an angular rate about Z-axis or acceleration in the Y direction is applied, displaced also in the Y direction. This displacement in the Y-direction is detected by detection means 505 as an applied angular rate or acceleration.

In driving means 504 of this type of inertial sensor, fixed electrodes and movable electrodes thereof are disposed so that combs are meshed, electrostatic attractions are generated alternately between the fixed electrodes and movable electrodes by application of a DC bias voltage as well as an AC drive signals between the fixed electrodes and the movable electrodes, and then the mass 500 is brought in vibration.

Furthermore, in detection means 505, fixed electrodes and movable electrodes thereof are disposed so that combs are meshed, and the displacements of the mass 500 are detected as the change of an electrostatic capacity, whereby detection signals based on angular rates or accelerations are output.

Herein, an enlarged diagram of a region RA in driving means 504 of the inertial sensor of FIG. 19 is shown in FIG. 20. In this art, since the mass 500 is vibrated also in the Y direction which is a detection direction while being vibrated in the X direction which is a driving direction, the combs of driving means 504 are vibrated in a track b which is a composition of an amplitude dr in the driving direction and an amplitude de in the detection direction. In this case, a distance d and a distance s of the fixed combs and moving combs that form driving means 504 and detection means 505 are required to be disposed at a distance of not less than a drive displacement and a detection displacement.

Further, a previously known angular rate sensor based on, for example, the specification of Japanese Patent No. 3077077 (Patent Document 1), is an angular rate sensor referred to as a tuning-fork typed sensor, and is constructed such that, by causing a pair of masses located on a basement layer to vibrate in inverted phases to each other, vibrations transmitted from the masses to the basement layer via support beams are mutually cancelled with a pair of masses.

Moreover, an angular rate sensor described in, for example, U.S. Pat. No. 6,691,571 (Patent Document 2) is formed of three elements of a drive frame, a Coriolis frame, and a detection frame. In this angular rate sensor, a drive frame is supported by beams that are flexible in a driving direction, and rigid in a detection direction, and is structured to be easy to move in the driving direction, and hard to move in the detection direction. Furthermore, a detection frame is likewise supported to be easy to move in the detection direction, and an excitation and a detection vibration can be divided. In this case, although the detection frame is connected to a basement layer at two points via beams that are rigid in the driving direction and flexible in the detection direction, these beams, since they are formed in a narrow space, are in a complicated configuration having plural bends.

Furthermore, a previously known angular rate sensor, based on, for example, "Design, Simulation, and Implementation of Two Novel Micromechanical Vibratory-Rate Gyroscopes", master's thesis of USA Carnegie Mellon University, published in May, 1998, (non-Patent Document 1), is formed of a drive frame, a Coriolis frame and a detection frame, and is structured such that the drive frame is supported by beams that are flexible in a driving direction and rigid in a detection direction, to be easy to move in the driving direction and hard to move in the detection direction. In addition, likewise a detection frame is supported to be easy to move in a detection direction, and is in such structure that excitation and a detection vibration are not coupled.

Further, a previously known angular rate sensor based on, for example, the specification of Japanese Patent No. 3589182, is comprised of not less than three masses disposed in alignment in a first axial direction, and vibrated in inverted phases one another in a second axis extending orthogonally to the first axis, and support beams that are extended in the first axial direction and that provide connections between these masses so as to be capable of displaced in the second axial direction. Further, this angular rate sensor is fixed to a basement layer at joints resided between these masses, and detects displacements generated by Coriolis force in the first axial direction. In this case, since suspensions including the masses are suspended with the joints, there is no leakage of excitation energy.

Further, by the simple combination of an angular rate sensor described in the above-mentioned Japanese Patent Application Laid-Open No. 2004-518969 and an angular rate sensor described in the above-mentioned Japanese Patent No. 3589182, an inertial sensor according to the present invention cannot be constructed.

SUMMARY OF THE INVENTION

Incidentally, in an above-mentioned angular rate sensor capable of separating vibration into excitation and detection that is taken into consideration by the present inventors, since a drive frame and a detection frame are fixed to a basement layer by a portion which is not a joint via support beams, vibrations of masses are likely to transmit to the basement layer via the support beams. Therefore, at the time of operation of a sensor, due to the leakage of vibration energy to the basement layer side, the amplitude and the vibration velocity of the masses are decreased, and Coriolis forces provided by application of angular rates come to be smaller, thus leading to a possibility of unstable detection sensitivity. Further, when vibrations are transmitted to the basement layer side, the masses may be vibrated in a detection direction by the vibration of the basement layer in spite of no application of angular rates. Accordingly, a problem exists in that errors of a detection value of angular rates are likely to occur, and thus reliability is decreased. Particularly in MEMS inertial sensors, an advantage exists in that it can be downsized by semiconductor manufacturing technology, but on the other hand, since the mass of weights are hard to secure, an important problem exists in how the leakage of vibrations is reduced, and excitation energy is effectively utilized.

Further, to prevent a detection frame from being affected by vibrations in a driving direction of a Coriolis frame, the detection frame is fixed to a basement layer at two points, left and right thereof. However, since there are formed in a narrow space beams that are rigid in a driving direction and flexible in a detection direction, they are in a complicated configuration with a plurality of bends. Owing to errors of e.g., processing fluctuations, there is a possibility of the occurrence of malfunction that the detection frame is easy to move in a certain direction, and is hard to move in an opposite direction thereto. Moreover, due to a complicated configuration, a problem exists in that fine-adjustment of rigidity of beams is not easy to make.

Furthermore, in an angular rate sensor in which the above-mentioned not less than three masses are disposed in series, vibrated in inverted phases one another, and fixed to a basement layer at joints resided therebetween, transmission of vibration energy from the masses to the basement layer side via support beams can be prevented. However, since vibrations in a driving direction and a detection direction are coupled, effects of disturbance based on the vibration in a driving direction which is not present in the detection direction are likely to arise. In addition, "joint" in known examples are the joints relative to vibration in a driving direction of the masses, and not the joints relative to vibration provided by Coriolis force, there is a possibility of decrease in sensitivity due to the leakage of vibration energy (loss of Coriolis force) in a detection direction. Furthermore, in this art, a problem exists in that when a basement layer is deformed by the change of ambient temperatures, rigidity of e.g., beams suspended over the basement layer is affected, and thus characteristics of a sensor comes to be unstable.

Consequently, an object of the present invention is to provide an art capable of improving performances of an inertial sensor.

The above and other objects and novel characteristics of the present invention will be apparent from the description of this specification and the accompanying drawings.

The typical ones of the inventions disclosed in this application will be briefly described as follows.

That is, the present invention is the one in which a plurality of sensor units forming an inertial sensor are designed and disposed such that all the components form a tuning-fork construction.

The effects obtained by typical aspects of the present invention will be briefly described below.

That is, due to that a plurality of sensor units forming an inertial sensor are designed and disposed such that all the components form a tuning-fork construction, it is possible to reduce or prevent vibration coupling in a driving direction and a detection direction, and the leakage (loss) of excitation energy and Coriolis force, so that it is possible to improve performance of an inertial sensor.

BRIEF DESCRIPTIONS OF THE DRAWINGS

DESCRIPTIONS OF THE PREFERRED EMBODIMENTS

Figure 1:
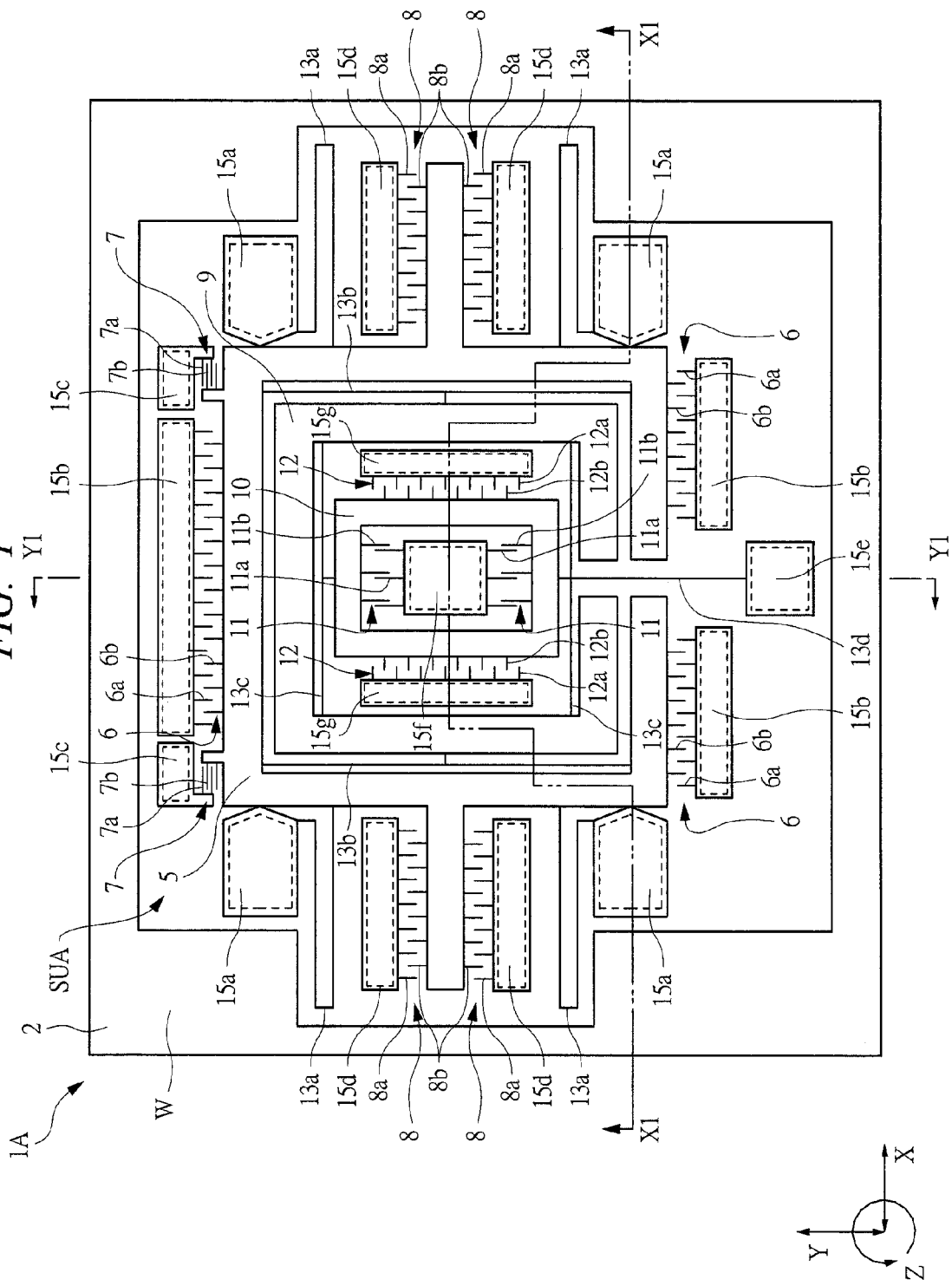
FIG. 1 is a plan view showing one example of an inertial sensor according to an embodiment of the present invention.

According to embodiments described hereinafter, although descriptions are made to be divided into a plurality of embodiments, except for the case of particularly described, they are not unrelated to each other, but they are in such relationship that one embodiment is a modified example, detailed description, supplementary description or the like of a part or all parts of the other embodiment. Furthermore, in the embodiments described hereinafter, in the case of descriptions of e.g., the number (inclusive of quantity, numerical value, amount, range or the like) of elements, except for the case of particularly described or the case of being limited to specified number obvious in principle, it is not limited to these specified numbers, but may be not less than or not more than specified numbers. Likewise, in the embodiments described hereinafter, when descriptions of configurations, positional relation or the like of components are made, except for the case of being particularly described or being considered that it is obviously not the case in principle, e.g., configurations substantially approximate or similar to these configurations or the like are included. This is the same as in numerical values or ranges. In addition, components having the same function are denoted by the same reference symbols, and repeated descriptions thereof are omitted as possible.

Hereinafter, preferred embodiments according to the present invention are described referring to the drawings.

Embodiment 1

Figure 2:
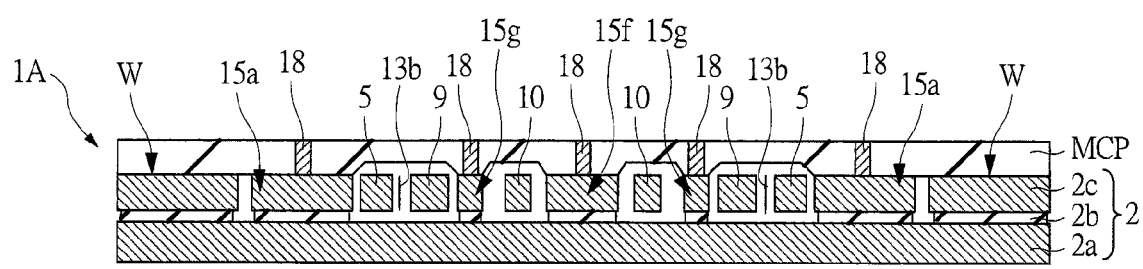
FIG. 2 is a sectional view taken along a line X1-X1 shown in FIG. 1.
Figure 3:
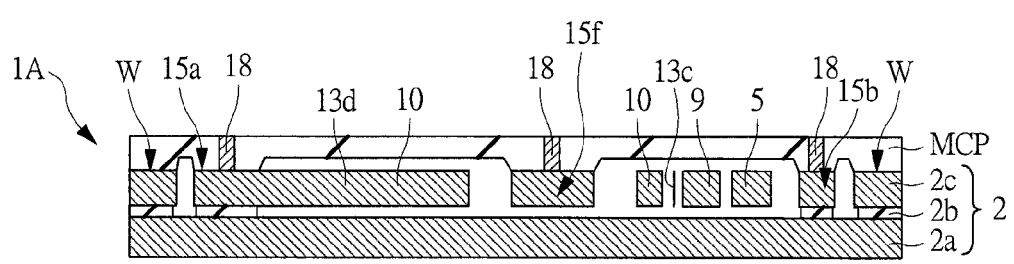
FIG. 3 is a sectional view taken along a line Y1-Y1 shown in FIG. 1.
Figure 4:
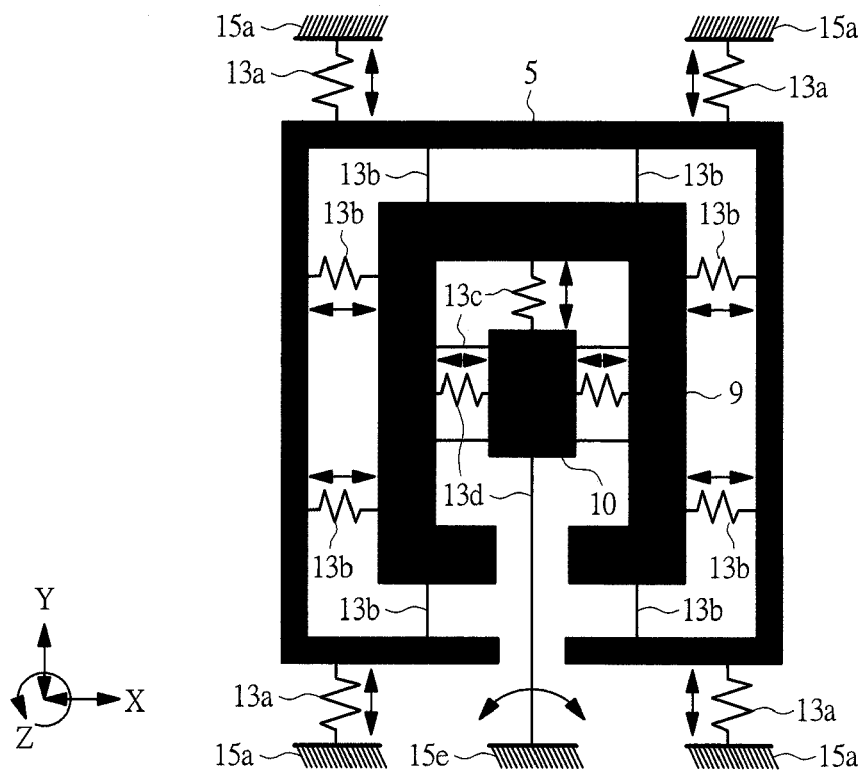
FIG. 4 is a block diagram showing the inertial sensor shown in FIG. 1 in schematically simplified manner.
Figure 5:
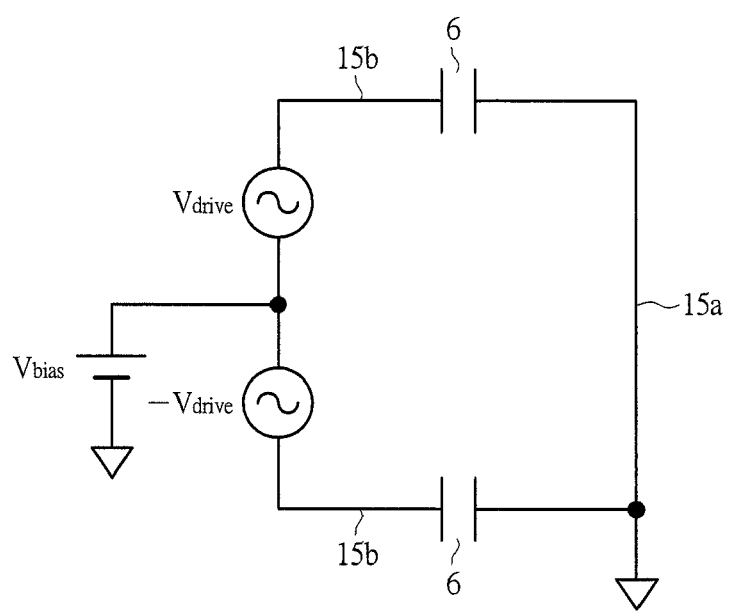
FIG. 5 is a circuit diagram of a drive circuit of the inertial sensor shown in FIG. 1.
Figure 6:
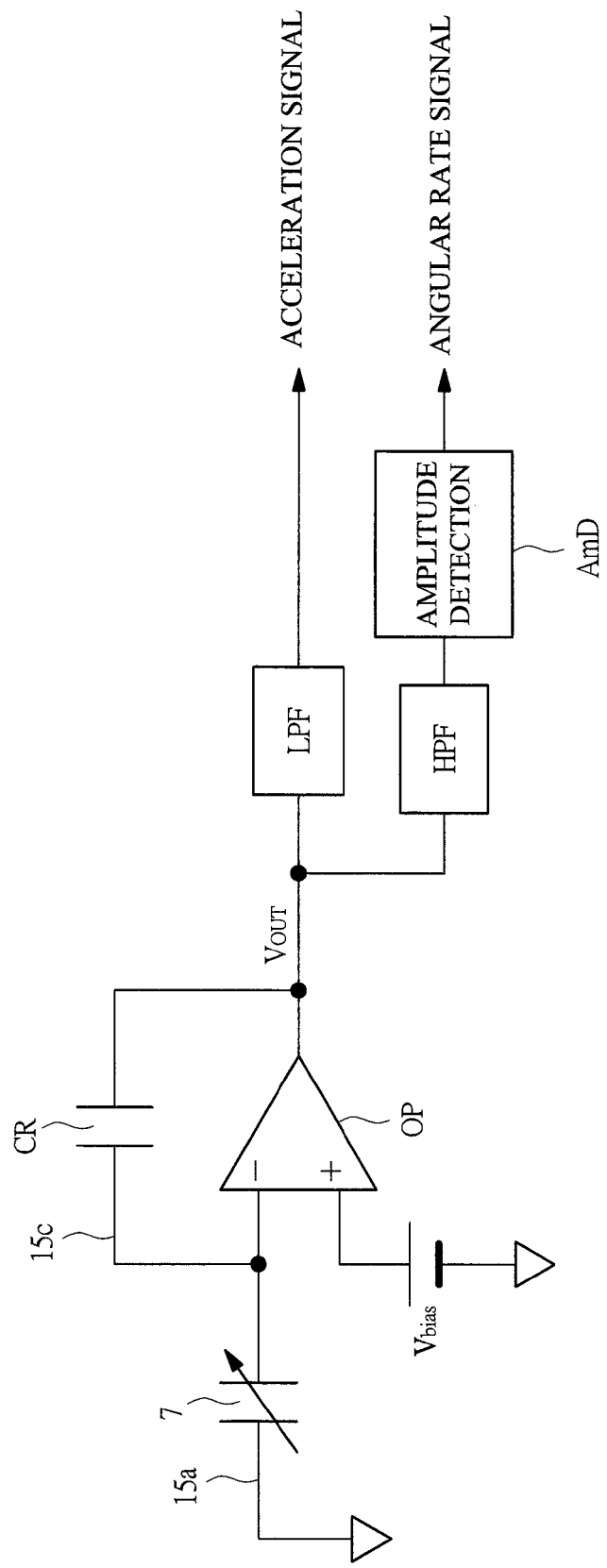
FIG. 6 is a circuit diagram of a detection circuit of the inertial sensor shown in FIG. 1.

FIG. 1 is a plan view showing one example of an inertial sensor according to a first preferred embodiment of the present invention. FIG. 2 is a sectional view taken along line X1-X1 shown in FIG. 1. FIG. 3 is a sectional view taken along line Y1-Y1 shown in FIG. 1. FIG. 4 is a block diagram showing the inertial sensor of FIG. 1 in schematically simplified manner. FIG. 5 is a circuit diagram of a drive circuit of the inertial sensor of FIG. 1. FIG. 6 is a circuit diagram of a detection circuit in the inertial sensor of FIG. 1. Further, to facilitate visualization of the drawing, FIG. 1 is shown without a sealing cap. Moreover, a reference symbol Y indicates a first direction, and a reference symbol X indicates a second direction X orthogonal to the above-mentioned first direction Y.

An inertial sensor 1A according the first embodiment is a sensor to measure physical value to arise due to inertia of object such as acceleration, angular rate (gyro), and angle. According to the first embodiment, an inertial sensor capable of simultaneously measuring an angular rate and acceleration is described as an example.

First, the fundamental principle of an inertial sensor is described. When an angular rate Ω is applied to a mass of weight m that vibrates in a certain direction (driving direction) about an axis orthogonal to a driving axis, Coriolis force described with the following Equation 1 is generated in a direction of a detection axis orthogonal to the driving axis and the axis to which an angular rate is applied. The inertial sensor detects the angular rate Ω using the principle of a mass being displaced in a detection direction by this Coriolis force. The displacement value of the mass by Coriolis force is shown with the following Equation 2. Further, the displacement value of the mass in the case where acceleration is applied is shown with the following Equation 3. The displacement values of the mass are outputted as values of applied acceleration and angular rate using detection means capable of detecting, for example, the change of electrostatic capacities.

$Fc=2m\Omega v$  Equation 1

Where: Fc: Coriolis force, m: mass of a mass, Ω: angular rate, v: velocity in a driving direction of a mass.

$x=Qs(Fc/k_{sense})$  Equation 2

Where: x: displacement value in a detection direction of a mass according to Coriolis force, Qs: quality factor in a direction of a detection axis, $k_{sense}$: constant of value in the detection direction $x=A(ma/k_{sense})$  Equation 3

Where: x: displacement value in a detection direction of a mass by the application of acceleration, a: acceleration, A: constant including effects of damping due to, e.g., air.

Now, one example of specific construction of the inertial sensor 1A is described. A basement layer 2 forming the inertial sensor 1A includes a first principal plane and a second principal plane positioned on the sides opposite to each other along the thickness direction. The first principal plane and the second principal plane of the basement layer 2 are having a planar shape of, for example, rectangular, and the area thereof is, for example, 3 mm². As this basement layer 2, for example, an SOI (Silicon On Insulator) basement layer is used. That is, the basement layer 2 comprises an active layer 2c on a support basement layer 2a having an insulating layer 2b therebetween. The support basement layer 2a is made of, for example, silicon (Si). The insulating layer 2b is made of, for example, silicon oxide (SiO₂). The active layer 2c is made of, for example, conductive silicon. The total thickness of the support basement layer 2a and the insulating layer 2b is, for example, several dozens to several hundreds μm, and the thickness of the active layer 2c is, for example, several μm to several dozens μm. The basement layer 2, however, is not limited to an SOI basement layer, but can be varied variously. A conductive polysilicon using e.g., surface MEMS technique, or a plated metal of e.g., nickel (Ni) may be used as an active layer 2c.

There is formed at the outer regions of the first principal plane of this basement layer 2 an external wall W. This external wall W is formed of a laminate of the above-mentioned insulating layer 2b and active layer 2c thereon. In a region surrounded by the above-mentioned external wall W on the first principal plane of this basement layer 2, one sensor unit SUA is formed. The sensor unit SUA includes a drive frame 5, drive means 6, monitor means 7, tuning means 8, a Coriolis frame 9, a detection frame 10, detection means 11, servo means 12, and beams 13a to 13d.

The above-mentioned drive frame 5 is formed by the above-mentioned active layer 2c being patterned to be frame-like in planar shape. This drive frame 5, with an insulating layer 2b being an under-layer thereof removed, disposed over the first principal plane of the basement layer 2 in the state of being separate from the support basement layer 2a, that is in the suspended state. Furthermore, this drive frame 5 is disposed so as to displace only in the above-mentioned driving direction (the first direction Y) along the first principal plane of the basement layer 2. In addition, since this drive frame 5 is needed in order to cause the Coriolis frame 9 described below to vibrate in an driving direction (the first direction Y), it has only to possess such rigidity as the drive frame 5 itself is not deformed. Further, to make the displacement in a detection direction (the second direction X) of the drive frame 5 by Coriolis force, the drive frame 5 is designed to be small in mass. Such a drive frame 5 is connected to supports 15a via beams 13a integrally connected to positions (four points) of being backwards (spaced apart) toward the driving direction (the first direction Y) from four corners of the perimeter of the drive frame 5.

The above-mentioned beams 13a are formed by the above-mentioned active layer 2c being patterned finer than the pattern of the above-mentioned drive frame 5, and, with the insulating layer 2b being an under-layer thereof removed, is disposed over the first principal plane of the basement layer 2 in the suspended state as is the drive frame 5. The beam 13a is relatively long in the detection direction (the second direction X), and formed to be relatively short in the driving direction (the first direction Y), thus to function as a leaf spring. The beam 13a is constructed to be flexible in the driving direction (the first direction Y), and to be rigid in the detection direction (the second direction X) as compared with rigidity in the above-mentioned driving direction (the first direction Y). Therefore, the above-mentioned drive frame 5 is disposed so as to vibrate only in the driving direction (the first direction Y).

The above-mentioned supports 15a are disposed at four points in the proximity of four corners at the perimeter of the drive frame 5. These supports 15a are formed of a laminate pattern of the above-mentioned active layer 2c and the above-mentioned insulating layer 2b, and are firmly joined and fixed to the support basement layer 2a of the basement layer 2. Herein, the supports 15a function to prevent the excessive displacement in the second direction X of the drive frame 5. In addition, the support 15a functions as an electrode providing electrical signal to the beams 13a and the drive frame 5 being suspensions thereof. The supports 15a are disposed with respect to the drive frame 5 so as to have a narrower distance than the distance between a fixed electrode 6a and a movable electrode 6b of the driving means 6 described below. Whereby, the supports 15a, when an acceleration above a certain level is applied in the detection direction (the second direction X), can be used as a stopper for preventing the drive frame 5 being excessively displaced, thus to be capable of preventing the above-mentioned driving means 6 from being broken due to impact.

The above-mentioned driving means 6 is means for causing the above-mentioned drive frame 5 to vibrate in the driving direction, and is disposed on both edge sides in the driving direction (the first direction Y) of the drive frame 5. This driving means 6 is constructed of an electrostatic comb-typed drive unit. That is, the driving means 6 is constructed such that a plurality of fixed electrodes 6a and a plurality of movable electrodes 6b are disposed alternately in the detection direction (the second direction X) so as to mesh.

The fixed electrodes 6a of driving means 6 are formed by the patterned above-mentioned active layer 2c. The fixed electrode 6a, with an active layer 2c thereof formed integrally with the active layer 2c of supports 15b, is connected to the support 15b and fixed to the basement layer 2. The supports 15b are disposed on both edge sides in the driving direction (the first direction Y) of the drive frame 5. These supports 15b are formed of a laminate pattern of the above-mentioned active layer 2c and the above-mentioned insulating layer 2b, and firmly joined and fixed to the support basement layer 2a of the basement layer 2. Herein, the support 15b functions as an electrode providing electrical signal to the above-mentioned fixed electrode 6a.

On the other hand, the movable electrodes 6b of driving means 6 are formed by the above-mentioned active layer 2c patterned. These movable electrodes 6b, with an insulating layer 2b being an under-layer thereof being removed, are disposed in the state of being suspended over the first principal plane of the basement layer 2. Furthermore, these movable electrodes 6b, with an active layer 2c thereof formed integrally with the drive frame 5 connected thereto, are connected to the drive frame 5 to be arranged to displace along with the drive frame 5. The driving means 6 of such construction alternately generates an electrostatic attraction between the fixed electrodes 6a and the movable electrodes 6b by the application of AC drive signals along with DC bias voltage between the fixed electrodes 6a and the movable electrodes 6a, and causes the drive frame 5 to vibrate in the driving direction (the first direction Y).

FIG. 5 shows a drive circuit causing such driving means 6 to drive. Moreover, with reference to FIG. 5, driving means 6 are shown with capacitors, and the supports 15a and 15b are shown with wirings and designated with the same reference numerals as an equivalent circuit in this drawing. Furthermore, a reference symbol $V_{bias}$ is a DC bias voltage to be applied to driving means 6, and a reference letter $V_{drive}$ is an AC drive signal to be applied to driving means 6. Appropriate application of the AC drive signal makes it possible to vibrate the drive frame 5.

Herein, since the drive frame 5 is vibrated only in the driving direction (the first direction Y), the distance between the fixed electrode 6a and the movable electrode 6b of the driving means 6 can be principally smaller as compared with the technique in which there is vibration coupling in the driving direction (the first direction Y) and the detection direction (the second direction X). Therefore, it is possible to achieve a higher efficiency of utilization of excitation energy.

The above-mentioned monitor means 7 are means for monitoring vibration states (for example, amplitudes in the driving direction (the first direction Y)) of the above-mentioned drive frame 5, and are disposed in the proximity of two corner portions on one edge side in the driving direction (the first direction Y) of the drive frame 5. This monitor means 7 is constructed such that a plurality of fixed electrode 7a and a plurality of movable electrode 7b are disposed alternately along the driving direction (the first direction Y) so as to mesh.

The fixed electrode 7a of the monitor means 7 is formed by the above-mentioned active layer 2c being patterned. These fixed electrodes 7a are formed integrally with the active layer 2c of the supports 15c, and connected to the supports 15c to be fixed to the basement layer 2. The supports 15c are disposed in the proximity of two corner portions on one edge side in the driving direction (the first direction Y) of the drive frame 5. These supports 15c are formed of a laminate pattern of the above-mentioned active layer 2c and the above-mentioned insulating layer 2b, and firmly joined and fixed to the support basement layer 2a of the basement layer 2. Herein, the support 15c functions as an electrode for providing electrical signal to the above-mentioned fixed electrode 7a.

On the other hand, the movable electrode 7b of the monitor means 7a is formed by the above-mentioned active layer 2c being patterned. The movable electrode 7b, with the insulating layer 2b being an under-layer thereof removed, is disposed in the suspended state over the first principal plane of the basement layer 2. Furthermore, the movable electrode 7b, with an active layer 2c thereof formed integrally with the active layer 2c of the drive frame 5 and connected thereto, are connected to the drive frame 5 to be fixed. The monitor means 7 of such construction detects and monitors vibration states of the drive frame 5 with the change of electrostatic capacities between opposing faces of the fixed electrode 7a and the movable electrode 7b, and outputs monitor signals thereof.

FIG. 6 shows a detection circuit of monitor signals obtained by such monitor means 7. Furthermore, with reference to FIG. 6, the monitor means 7 is shown with a capacitor, and supports 15a and 15c are shown with wirings and designated with the same reference numerals as an equivalent circuit in this drawing. Moreover, a reference symbol OP is an operational amplifier, a reference symbol LPF is a low-pass filter, a reference symbol HPF is a high-pass filter, a reference letter AmD is an amplitude detection circuit, a reference symbol CR is a reference capacitor, a reference symbol $V_{bias}$ is a bias voltage to be applied to the operational amplifier OP, and a reference symbol $V_{out}$ is an output voltage.

Herein, it is supposed that the capacity of the monitor means 7 is changed only $\Delta C$ due to displacement of the drive frame 5. Since the voltage to be applied to the above-described monitor means 7 is $V_{bias}$ all the time by means of the operational amplifier OP, a charge $\Delta Q = \Delta C \cdot V_{bias}$ is required to be carried to the monitor means 7 due to the change of capacity. Since this charge is equal to the charge carried from the reference capacitor CR, the voltage of the reference capacity CR is changed as is expressed with $(\Delta C/CR)V_{bias}$. Thus, the output voltage $V_{out}$ is $V_{out} = (1+\Delta C/CR)V_{bias}$.

The above-mentioned tuning means 8 act to actively control the resonance frequency of the above-mentioned drive frame 5, and are disposed on both edge sides in the detection direction (the second direction X) of the drive frame 5. These tuning means 8 are constructed by a plurality of fixed electrode 8a and a plurality of movable electrode 8b being disposed alternately along the detection direction (the second direction X) so as to mesh.

The fixed electrodes 8a of tuning means 8 are formed by the above-mentioned active layer 2c being patterned. These fixed electrodes 8a, with an active layer 2c thereof formed integrally with the active layer 2c of supports 15d, are connected to the supports 15d to be fixed to the basement layer 2. The supports 15d are formed of a laminate pattern of the above-mentioned active layer 2c and the above-mentioned insulating layer 2b, and firmly joined and fixed to the support basement layer 2a of the basement layer 2. Herein, the support 15d functions as an electrode to provide electrical signal to the above-mentioned fixed electrodes 8a.

On the other hand, the movable electrodes 8b of tuning means 8 are formed by the above-mentioned active layer 2c being patterned. These movable electrodes 8b, with an insulating layer 2b being an under-layer thereof removed, are disposed in the suspended state over the first principal plane of the basement layer 2. The movable electrodes 8b, with the active layer 2c thereof formed integrally with the active layer 2c of the drive frame 5, are connected to the drive frame 5 to be fixed.

Herein, the above-mentioned drive frame 5 is required to vibrate at a constant amplitude at all times in order to be highly stable, highly sensitive, and highly reliable. However, amplitudes are varied over time by the change of ambient temperatures. Therefore, to make the amplitude detected by the above-mentioned monitor means 7 constant all the time, a DC bias voltage is applied between the fixed electrodes 8a and movable electrodes 8b of tuning means 8 to make control. The control circuit in this case is the same as that in which 0V is applied as the AC drive signal $V_{drive}$ to the drive circuit for driving means 6 shown in the above-mentioned FIG. 5, so that descriptions thereof will be omitted.

In addition, tuning means 8 can be used instead of or together with the above-mentioned driving means 6. In the case of being used instead of the driving means 6, the above-mentioned driving means plays a role of tuning means 8. In the case of being used together, an excitation force is the addition of an excitation force provided by the above-mentioned driving means 6 and an excitation force provided by tuning means 8, so that higher sensitivity can be achieved.

Inside the above-mentioned drive frame 5, the above-mentioned Coriolis frame 9 is disposed. This Coriolis frame 9 is formed by the above-mentioned active layer 2c being patterned to be frame-like in planar shape. Also this Coriolis frame 9, with the insulating layer 2b being an under-layer thereof removed, is disposed in the suspended state over the first principal plane of the basement layer 2. This Coriolis frame 9 is designed so as to be capable of displaced both the driving direction (the first direction Y) and the detection direction (the second direction X). Furthermore, the Coriolis frame 9 vibrates along the first principal plane of the basement layer 2 as well. Such Coriolis frame 9 is connected to the drive frame 5 via beams 13b. Whereby, the Coriolis frame 9 is arranged to vibrate in the driving direction (the first direction Y) with the same amplitude and in the same phase as those of the drive frame 5. Accordingly, when angular rate about Z-axis is applied, the Coriolis frame 9 is displaced in the detection direction (the second direction X) by Coriolis force. That is, the mass of the Coriolis frame 9 is to be m of the above-mentioned Equation 1. Therefore, to obtain higher sensitivity, the Coriolis frame 9 is designed to have a large mass.

The above-mentioned beams 13b are formed by the above-mentioned active layer 2c being patterned finer than the pattern of the above-mentioned Coriolis frame 9 (i.e., the beams 13b are formed integrally with the active layers 2c of the drive frame 5 and Coriolis frame 9), and with the insulating layer 2c being an under-layer thereof removed, are disposed over the first principal plane of the basement layer 2 in the suspended state as are the drive frame 5 and the Coriolis frame 9. These beams 13b include a relatively long part extending linearly in the driving direction (the first direction Y) and a relatively short part extending linearly in the detection direction (the second direction X) orthogonal thereto. Both ends of relatively long part are connected to the inner periphery of the drive frame 5. Further, one end of the above-mentioned relatively short part is connected to a longitudinal center of the above-mentioned relatively long part, and the other end is connected to the center of the edge in the detection direction (the second direction X) of the Coriolis frame 9. These beams 13b function as a leaf spring. These beams 13b, however, are constructed to be rigid in the driving direction (the first direction Y), and to be flexible in the detection direction (the second direction X) as compared with the rigidity in the above-mentioned driving direction (the first direction Y). Therefore, although the vibration in the driving direction (the first direction Y) of the above-mentioned drive frame 5 is transmitted to the Coriolis frame 9 as it is, the vibration in the detection direction (the second direction X) of the Coriolis frame 9 is absorbed, and is not transmitted to the drive frame 5.

Inside such a Coriolis frame 9, a detection frame 10 is disposed. This detection frame 10 is formed by the above-mentioned active layer 2c being patterned to be frame-like in planar shape. Also this detection frame 10, with the insulating layer 2b being an under-layer thereof removed, is disposed in the suspended state over the first principal plane of the basement layer 2. This detection frame 10 is connected to the Coriolis frame 9 via beams 13c. Whereby, the detection frame 10 is constructed to vibrate with the same amplitude and in the same phase as those of vibration in the detection direction (the second direction X) of the Coriolis frame 9. Furthermore, the detection frame 10 vibrates along the first principal plane of the basement layer 2 as well.

The above-mentioned beams 13c are formed by the above-mentioned active layer 2c being patterned finer than the pattern of the above-mentioned Coriolis frame 9 or detection frame 10 (i.e., the beams 13c are formed integrally with the active layer 2c of the drive frame 5 and the Coriolis frame 9), and with the insulating layer 2b being an under-layer thereof removed, are disposed over the first principal plane of the basement layer 2 in the suspended state as are the drive frame 5 and the like.

These beams 13c include a relatively long part extending linearly in the detection direction (the second direction X) and a relatively short part extending linearly in the driving direction (the first direction Y) orthogonal thereto. Both ends of the relatively long part of the beams 13c are connected to the inner periphery of the Coriolis frame 9. Further, one end of the above-mentioned relatively short part is connected to a longitudinal center of the above-mentioned relatively long part, and the other end is connected to the center of the edge in the driving direction (the first direction Y) of the detection frame 10. These beams 13c function as a leaf spring. These beams 13c, however, are constructed to be flexible in the driving direction (the first direction Y), and to be rigid in the detection direction (the second direction X) as compared with rigidity in the above-mentioned driving direction (the first direction Y). Therefore, although vibration in the detection direction (the second direction X) of above-mentioned Coriolis frame 9 is transmitted to the detection frame 10 as it is, vibration in the driving direction (the first direction Y) thereof is to be absorbed.

In addition, the detection frame 10 is connected to a support 15e via a beam 13d, and fixed to the basement layer 2.

Therefore, vibration in the driving direction (the first direction Y) of the Coriolis frame 9 is absorbed by the beams 13c. That is, vibration in the detection direction (the second direction X) of the detection frame 10 comes out as a rotational vibration with respect to the support 15e. Accordingly, the detection frame 10 has only to possess such rigidity as the detection frame 10 itself is not deformed. The detection frame 10 is designed so as to be small in mass in order to improve detection sensitivity and to prevent the generation of unnecessary signals.

The beam 13d to fix the above-mentioned detection frame 10 to the basement layer 2 is formed by the above-mentioned active layer 2c being patterned finer than the pattern of the above-mentioned Coriolis frame 9 and detection frame 10 (i.e., the beam 13d is formed integrally with the active layer 2c of the Coriolis frame 9 and the detection frame 10). This beam 13d, with the insulating layer 2b being an under-layer thereof removed, is disposed over the first principal plane of the basement layer 2 in the suspended state as are the drive frame 5 and the like.

This beam 13d is formed in a simple pattern extending linearly in the driving direction (the first direction Y). One end thereof is connected to the detection frame 10, and the other end is connected to the support 15e. This beam 13d functions as a leaf spring as well. This beam 13d, however, is constructed to be rigid in the driving direction (the first direction Y), and to be flexible in the detection direction (the second direction X) as compared with rigidity in the above-mentioned driving direction (the first direction Y). Therefore, the detection frame 10 is not affected by vibration in the driving direction (the first direction Y) of the Coriolis frame 9, but is to vibrate with the same amplitude as well as in the same phase with following vibration in the detection direction (the second direction X) of the Coriolis frame 9.

The above-mentioned support 15e is disposed inside the above-mentioned external wall W, as well as outside of the sensor unit SUA i.e., outside of the drive frame 5. That is, the support 15e is disposed at one point further outwardly apart from the perimeter of the drive frame 5. This support 15e is formed by the above-mentioned active layer 2c and the above-mentioned insulating layer 2b being patterned, and is firmly joined and fixed to the support basement layer 2a of the basement layer 2. Herein, the support 15e functions as an electrode providing electrical signals to movable electrodes 11b of detection means 11 through the beam 13d and detection frame 10 which are suspensions thereof.

Like this, in the first embodiment, the detection frame 10 is constructed to be supported solely with one beam 13d on one edge side thereof. Whereby, as compared with the case where the detection frame 10 is supported on both edge sides or the case where it is supported at not less than two points, or the case where it is supported with not less than two beams, it is possible to reduce processing fluctuations, and to reduce or eliminate errors due to processing fluctuations.

Moreover, since the beam 13d is configured to be linear and simple as mentioned above, a resonance frequency in the detection direction (the second direction X) can be adjusted (changed) comparatively easily by changing the width of the beam 13d. Furthermore, in the case of technique in which a support to support the beam 13d is disposed in an internal part of a sensor unit SUA, the beam 13d has to be made to be small and fine in respect of adjusting the above-mentioned resonance frequency, and thus there are limits on processing. Whereas, according to the first embodiment, the support 15e is disposed outside of the sensor unit SUA (drive frame 5), thereby enabling to adjust the above-mentioned resonance frequency by adjusting a longitudinal length of the beam 13d.

Consequently, it is possible to adjust a resonance frequency thereof more easily, and additionally to set the adjustment range of a resonance frequency thereof more widely.

Furthermore, due to that the beam 13d is fixed outside the detection frame 10 and the drive frame 5, it is possible to form the beam 13d flexible in the detection direction (the second direction X) even in a relatively simple structure. Thus, it is possible to reduce the loss of displacement in the detection direction (the second direction X) owing to the reaction force of the beam 13d.

Moreover, due to that the detection frame 10 is fixed at one point with a beam 13d, it is possible to make a Coriolis frame 9 large in a drive frame 5, thus to be advantageous for obtaining a more sensitized inertial sensor 1A.

Furthermore, due to that a detection frame 10 is fixed at one point, being at the support 15e, it is possible to reduce the leakage of vibration, and thus to improve sensitivity of an inertial sensor 1A.

The above-mentioned detection means 11 is disposed between the inner periphery of the detection frame 10 and a support 15f. This detection means 11 is formed of a comb-typed detector. That is, the detection means 11 is constructed of a plurality of fixed electrode 11a and a plurality of movable electrode 11b being disposed alternately along the detection direction (the second direction X) so as to mesh. This detection means 11 detects the displacements as the change of an electrostatic capacity between the detection electrodes (between the fixed electrodes 11a and the movable electrodes 11b) when the detection frame 10 is displaced by application of acceleration and angular rate. That is, the change of electrostatic capacity to be varied in response to that the fixed electrodes 11a and the movable electrodes 11b come close or come away from each other due to the displacement of the detection frame 10.

The fixed electrodes 11a of detection means 11 are formed by the above-mentioned active layer 2c being patterned. These fixed electrodes 11a, with an active layer 2c thereof formed integrally with the active layer 2c of the support 15f, are connected to the support 15f to be fixed to the basement layer 2. The support 15f is disposed at the central portion in the frame of the detection frame 10. This support 15f is formed by the above-mentioned active layer 2c and the above-mentioned insulating layer 2b being patterned, and is firmly joined and fixed to the support basement layer 2a of the basement layer 2. Herein, the support 15f functions as an electrode providing electrical signals to the above-mentioned fixed electrodes 11a.

On the other hand, the movable electrodes 11b of the detection means 11 are formed by the above-mentioned active layer 2c being patterned. The insulating layer 2b being an under-layer of these movable electrodes 11b is removed, and thus the movable electrodes 11b are disposed in the suspended state over the first principal plane of the basement layer 2. The movable electrodes 11b, with an active layer 2c thereof formed integrally with the active layer 2c of the detection frame 10, are connected to the detection frame 10. A detection circuit in this case is the same as the detection circuit for monitor means 7 shown in the above-mentioned FIG. 6, so that descriptions thereof will be omitted.

Herein, the detection frame 10 is vibrated only in the detection direction (the second direction X), so that the area of the opposing faces of the fixed electrodes 11a and the movable electrodes 11b of the detection means 11 can be principally wider as compared with the technique in which there is vibration coupling in a driving direction and in a detection direction. Consequently, it is possible to improve sensitivity or stability of an inertial sensor 1A.

The above-mentioned servo means 12 is a means for generating a rebalance force based on the detected displacements detected by detection means 11, and for making an active control so that the amplitude of a detection frame 10 is zero at all times. The servo means 12 are disposed on the edge side in the detection direction (the second direction X) of the detection frame 10, as well as between the outside periphery of the detection frame 10 and the inner periphery of the Coriolis frame 9. This servo means 12 is constructed of a plurality of fixed electrode 12a and a plurality of movable electrode 12b being disposed alternately along the driving direction (the first direction Y) so as to mesh.

The fixed electrodes 12a of the servo means 12 are formed by the above-mentioned active layer 2c being patterned. These fixed electrodes 12a, with the active layer 2c thereof formed integrally with the active layer 2c of supports 15g, are connected to the supports 15g to be fixed to the basement layer 2. The supports 15g are disposed on the edge sides in the detection direction (the second direction X) of detection frame 10, as well as between the outside periphery of the detection frame 10 and the inner periphery of the Coriolis frame 9. These supports 15g are formed of a laminated pattern of the above-mentioned active layer 2c and the above-mentioned insulating layer 2b, and thus firmly joined and fixed to the support basement layer 2a of the basement layer 2. Herein, the supports 15g function as electrodes providing electrical signals to the above-mentioned fixed electrodes 12a.

On the other hand, the movable electrodes 12b of the servo means 12 are formed by the above-mentioned active layer 2c being patterned. These movable electrodes 12b, with the insulating layer 2b being an under-layer thereof removed, are disposed in the suspended state over the first principal plane of the basement layer 2. The movable electrodes 12, with an active layer 2c thereof formed integrally with the active layer 2c of the detection frame 10 and connected thereto, are connected to the detection frame 10.

Herein, the detection frame 10 is vibrated only in the detection direction (the second direction X), so that the distance between the fixed electrode 12a and the movable electrode 12b of servo means 12 can principally be made narrower as compared with the technique in which there is vibration coupling in the driving direction and in the detection direction. Therefore, even if the voltage to be applied is relatively small, a large rebalance force can be generated. Since the above-mentioned servo means 12 can output the voltages to be applied for generating a rebalance force as values of angular rates or accelerations, it may be used as detection means. Furthermore, a control circuit in this case is the same as the drive circuit for the drive frame 6 shown in the above-mentioned FIG. 5, so that descriptions thereof will be omitted. Moreover, servo means 12 may be used for adjusting a resonance frequency of the detection frame 10 as are tuning means 8.

Over the first principal plane of such a basement layer 2, there is anodic-bonded a sealing cap MCP. Whereby, the sensor unit SUA is sealed so that moving parts thereof are located in an ambient atmosphere of a suitable pressure. The sealing cap MCP is made of, for example, Pyrex glass, and there are provided a plurality of electrode 18 are disposed so as to pass through the upper and lower faces thereof. These electrodes 18 are electrodes of providing desired electrical signals from outside of the inertial sensor 1A to the sensor unit SUA in an internal part, and are electrically connected to the above-mentioned supports 15a to 15g.

However, the sealing construction is not limited to the sealing construction by anodic bonding, but may be variously modified. For example, the sealing cap MCP may be bonded to a basement layer 2 with an adhesive. Further, after wire bonding, the entire sensor unit SUA may be put in a package and sealed. In addition, packaging may be made in the state in which a control circuit such as driving means 6 or detection means 11 is mounted together on the basement layer 2. Furthermore, electrodes for providing desired electrical signals to the sensor unit SUA may be obtained from the second principal plane side of the basement layer 2. As an alternative, the sensor unit SUA may be sealed by forming a sealing film on the sensor unit SUA by the Chemical Vapor Deposition method (CVD), by sputtering or the like.

Embodiment 2

Figure 7:
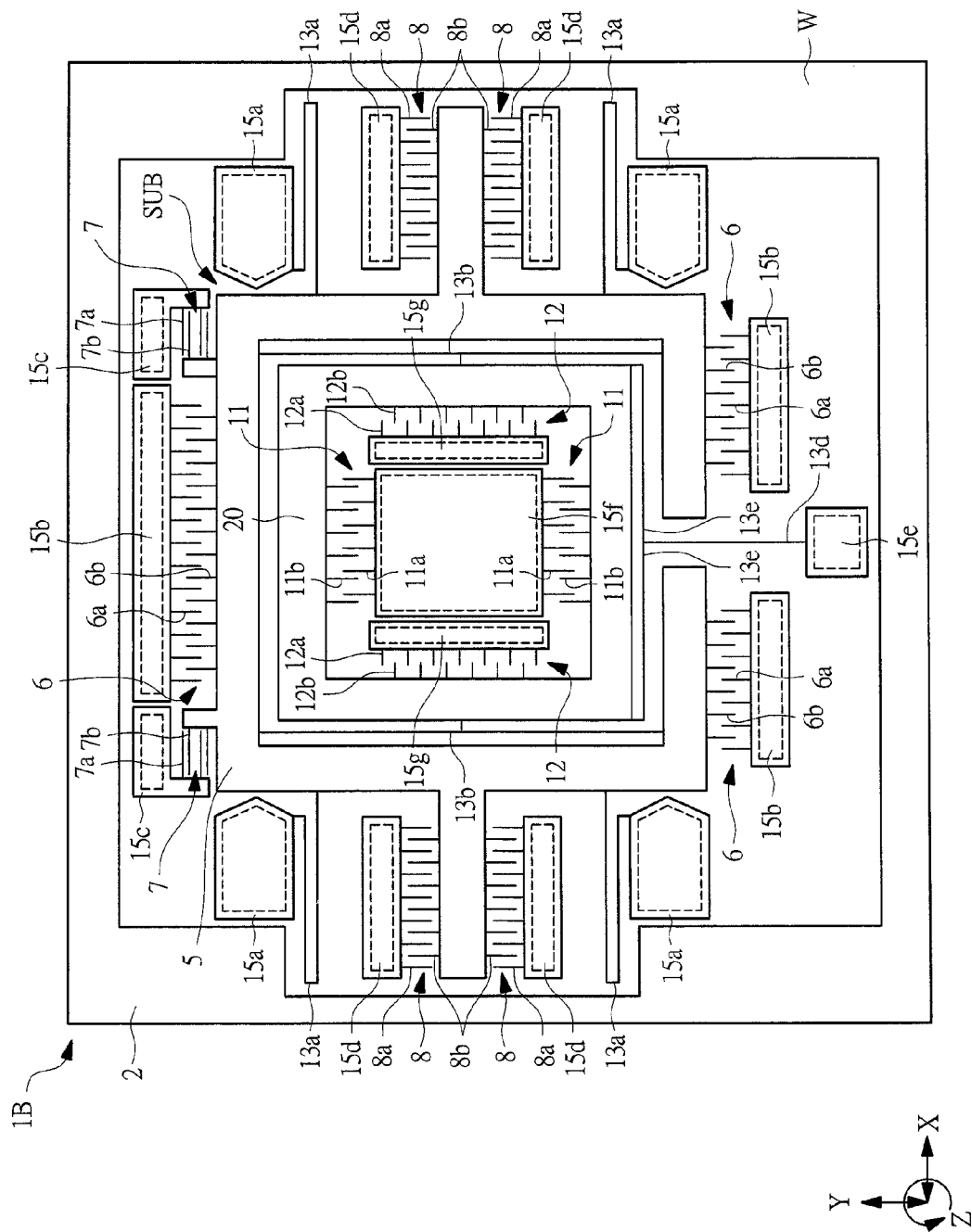
FIG. 7 is a plan view showing one example of an inertial sensor according to another embodiment of the invention.

In a second embodiment, an example in which a Coriolis frame and a detection frame of above-mentioned inertial sensor are formed in an integral structure is described. FIG. 7 shows a plan view of one example of an inertial sensor 1B according to the second embodiment. In FIG. 7, to facilitate visualization of the drawing, illustration of a sealing cap is omitted.

In the second embodiment, inside a drive frame 5 of a sensor unit SUB, an element 20 is disposed between the drive frame 5 and a support 15f. The element 20 is an integral structure of a Coriolis frame 9 and a detection frame 10 as mentioned above, and functions as both a Coriolis frame 9 and a detection frame 10. This element 20 is formed by an active layer 2c thereof being patterned to be frame-like in planar shape. This element 20, with the insulating layer 2c being an under-layer thereof removed, is disposed in the suspended state over the first principal plane of a basement layer 2.

Furthermore, the element 20 is connected to the drive frame 5 via beams 13b. Moreover, the element 20 is connected to a support 15e via beams 13d and 13e to be supported. The beams 13e are formed by the above-mentioned active layer 2c being patterned. The beams 13e, with an insulating layer 2b being an under-layer thereof removed, are disposed in the suspended state over the first principal plane of the basement layer 2. These beams 13e are formed to be flexible in the driving direction (the first direction Y), and to be more rigid in the detection direction (the second direction X) as compared with rigidity of the beams 13e in the above-mentioned driving direction (the first direction Y). Whereby, the element 20 is supported so as to be capable of being displaced without restraint in the driving direction (the first direction Y).

Detection means 11, when the element 20 is displaced by application of acceleration or angular rate, detect the displacements thereof. At the inner periphery of the element 20 on both end sides in the driving direction (the first direction Y), movable electrodes 11b of the above-mentioned detection means 11 are formed integrally with the active layer 2c of the element 20 and connected thereto.

Servo means 12 act to make an active control so that the amplitude in the detection direction (the second direction X) of the element 20 is zero all the time. At the inner periphery of the element on both end sides in the detection direction (the second direction X), movable electrodes 12b of the above-mentioned servo means 12 are formed integrally with the active layer 2c of the element 20 and connected thereto.

The second embodiment is constructed as is above-mentioned first embodiment other than such structures. Further, according to the second embodiment, there may be no beams 13e and 13d, and no support 15e.

According to the second embodiment, besides the advantages obtained in the first embodiment, the following advantages can be obtained. That is, due to that a Coriolis frame and a detection frame are formed in an integral structure, it is possible to form a sensor unit SUB easily. Further, due to that a Coriolis frame and a detection frame are formed in an integral structure, it is possible to downsize an inertial sensor 1B.

Embodiment 3

In a third embodiment, a construction of an inertial sensor is the same as those of the first and second embodiments. A different point is that functions of a drive frame 5 and a detection frame 10 of FIG. 1 are opposite to the construction of the inertial sensor 1A of the first embodiment. Furthermore, in the inertial sensor 1B of the second embodiment, the element 20 in FIG. 7 functions as both a drive frame and a Coriolis frame described in the first embodiment, the drive frame 5 in FIG. 7 functions as a detection frame described in the first embodiment.

Functions of each component of the inertial sensor according to the third embodiment will be described using FIG. 1 used in the description of the first embodiment as follows.

In the third embodiment, a detection frame 10 is displaced in the driving direction (herein, the second direction X) by servo means 12. Further, a drive frame 5 is displaced in the detection direction (herein, the first direction Y), and the displacement thereof is detected by monitor means 7. Therefore, the detection means 11 are used as monitor means, driving means 6 are used as tuning means or servo means, and tuning means 8 are used as servo means or tuning means.

Embodiment 4

In a fourth embodiment, a construction in which two sensor units are disposed symmetrically on the first principal plane of the same basement layer is described.

Figure 8:
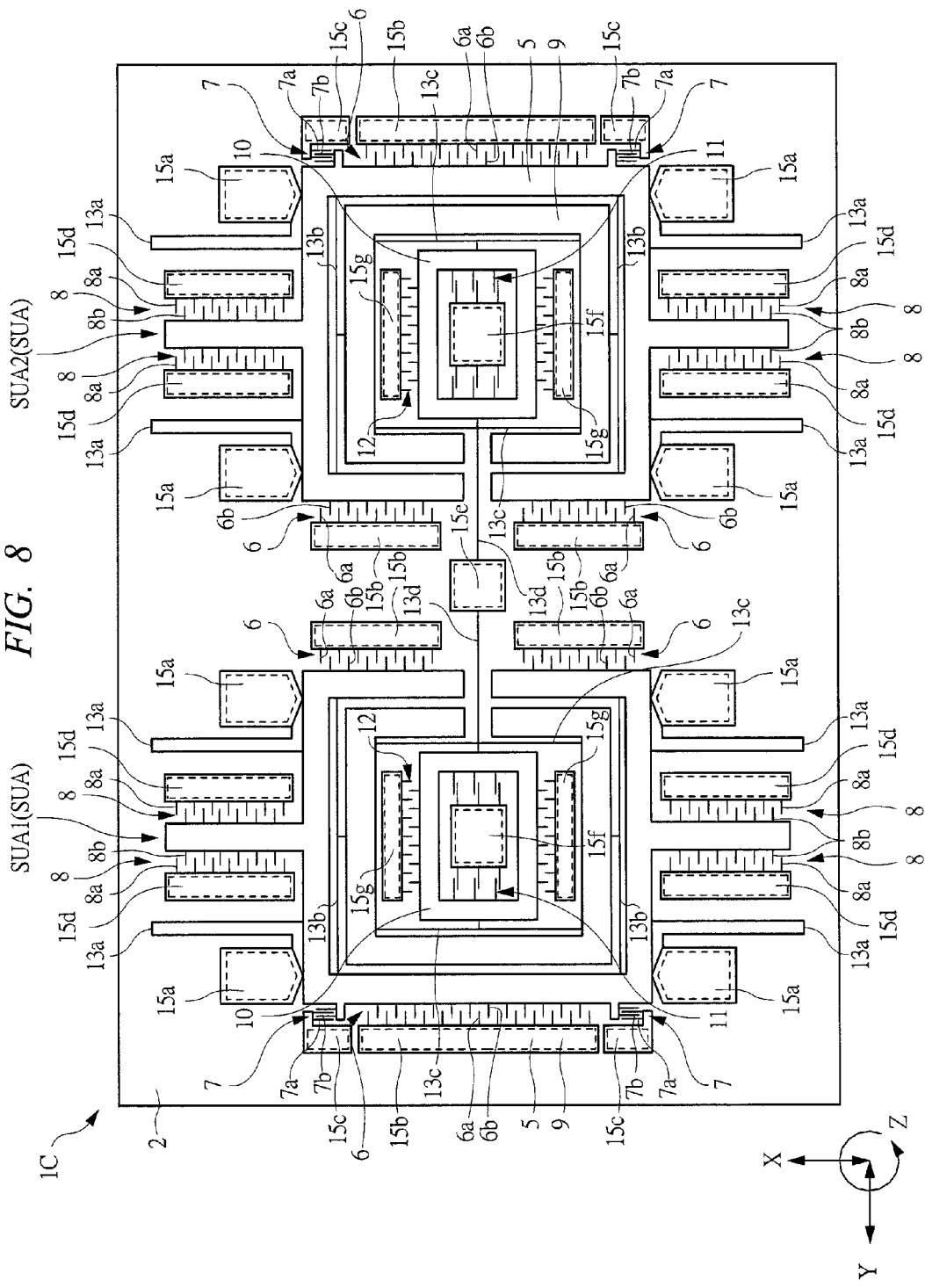
FIG. 8 is a plan view showing one example of an inertial sensor according to another embodiment of the present invention.
Figure 9:
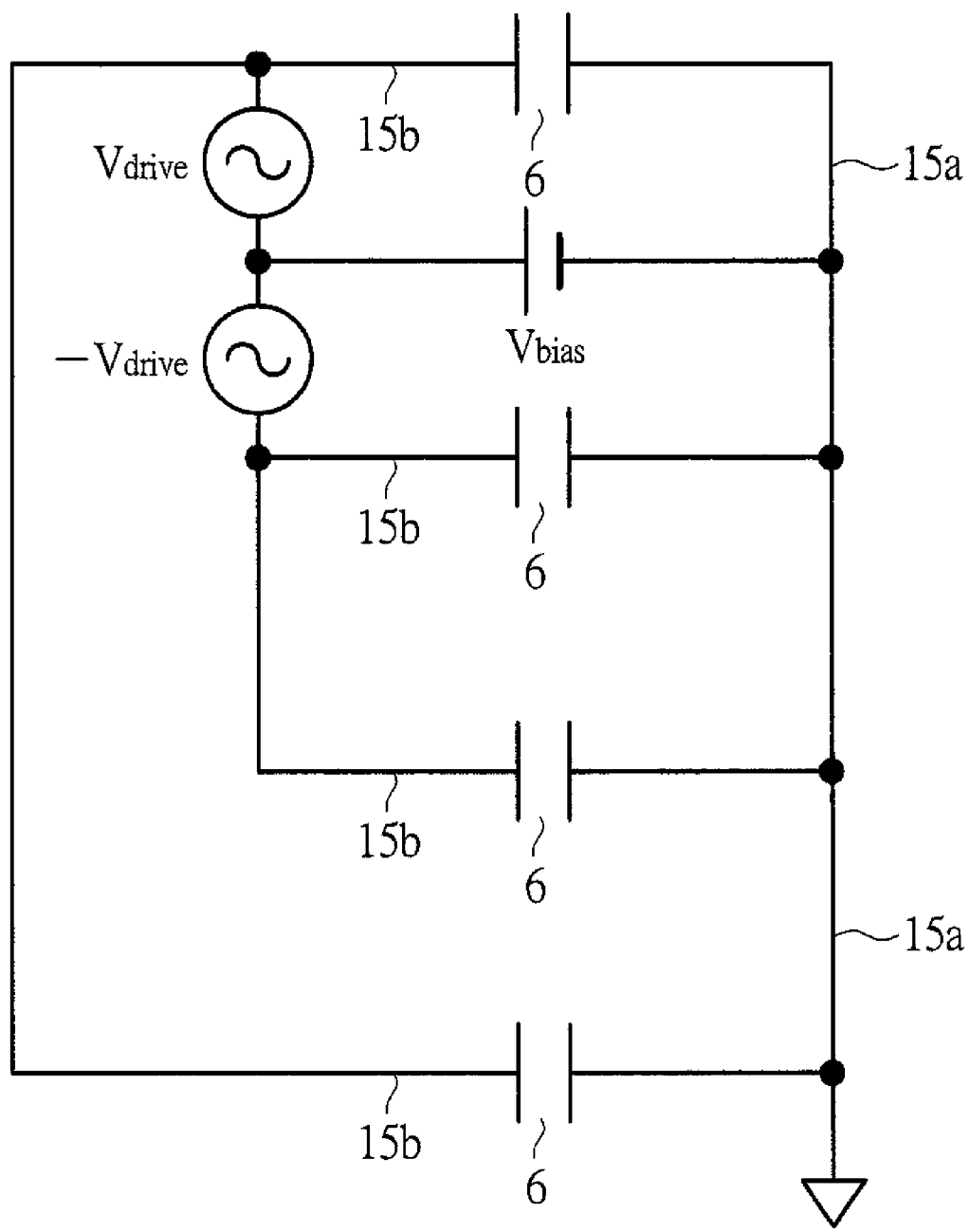
FIG. 9 is a circuit diagram of a drive circuit in a drive frame for the inertial sensor shown in FIG. 8.

FIG. 8 shows a plan view of one example of an inertial sensor 1C according to the fourth embodiment. FIG. 9 shows a circuit diagram of a drive circuit of a drive frame of the inertial sensor of FIG. 8. Furthermore, in FIG. 8, to facilitate visualization of the drawing, illustrations of an external wall W and a sealing cap MCP are omitted.

The inertial sensor 1C according to the fourth embodiment is an inertial sensor capable of measuring accelerations and angular rates on one axis, and includes two sensor units SUA (SUA1, SUA2). These two sensor units SUA1 and SUA2, on the first principal plane of the same basement layer 2, on a first axis extending in a first direction Y, are disposed side by side symmetrically centering around a support 15e that is located on the same first axis. According to the fourth embodiment, these two sensor units SUA1 and SUA2 are arranged to vibrate in inverted phases each other. Whereby, it is possible to achieve a stable vibration, and thus it is possible to effectively utilize excitation energy.

Drive frames 5, 5 of each of the sensor units SUA1, SUA2 are arranged to vibrate in inverted phases each other along the driving direction (the first direction Y in FIG. 8) by driving means 6, 6 of each of the sensor units SUA1, SUA2. Also in this case, drive frames 5 are vibrated along the first principal plane of the basement layer 2. Driving means 6, 6 of each of the sensor units SUA1, SUA2 are means for causing the drive frames 5, 5 of each of the sensor units SUA1, SUA2 to vibrate in inverted phases in the driving direction (the first direction Y). FIG. 9 shows one example of a drive circuit of such drive frames 5. Further, with reference to FIG. 9, driving means 6 are shown with a capacitor, and supports 15a, 15b are shown with wirings and designated with the same reference numerals as an equivalent circuit in this drawing. Moreover, a reference letter $V_{bias}$ is a DC bias voltage to be applied to each driving means 6 of the sensor units SUA1, SUA2, and a reference letter $V_{drive}$ is an AC drive signal to be applied to each driving means 6 of the sensor units SUA1, SUA2. By suitably applying these AC drive signals, each of the drive frames 5, 5 of the sensor units SUA1, SUA2 can be vibrated in inverted phases.

Supports 15b disposed on either side of each of the sensor units SUA1, SUA2 are located on the first principal plane of the basement layer 2 as mentioned above, and fix fixed electrodes 6a of driving means 6, 6 of each of the sensor units SUA1, SUA2 to the basement layer 2. Further, the supports 15b are used as electrodes for providing electrical signals to the fixed electrodes 6a of driving means 6 of each of the sensor units SUA1, SUA2. The supports 15b, 15b between two sensor units SUA1, SUA2 are not necessarily separated, but may be connected to each other. Whereby, the number of electrodes 18 of a sealing cap MCP can be decreased, and the sensor units SUA1, SUA2 can be placed closer to each other. Consequently, it is possible to downsize an inertial sensor 1C.

The resonance frequency in the driving direction (the first direction Y) of each sensor unit SUA1, SUA2 can be adjusted using tuning means 8, 8 of each of the sensor units SUA1, SUA2. To obtain higher stability and higher sensitivity of an inertial sensor, it is necessary to make the resonance frequencies of both of the sensor units SUA1, SUA2 coincide. There are, however, some cases where the masses of components of two sensor units SUA1, SUA2 are different due to processing fluctuations. That is, since two sensor units SUA1, SUA2 are not fully symmetric, resonance frequencies may be different. Then, according to the fourth embodiment, the resonance frequencies are made to be coincident with the use of tuning means 8. Whereby, it is possible to achieve higher stability and higher sensitivity of an inertial sensor 1C.

Coriolis frames 9, 9 of each sensor units SUA1, SUA2 are cooperated with the drive frames 5, 5 of respective sensor units SUA1, SUA2, and vibrated in inverted phases each other. When angular rates are applied about z-axis, the Coriolis frames 9, 9 are displaced in directions opposite to each other in the detection direction (the second direction X) owing to Coriolis force. In addition, when accelerations are applied in the second direction X, both of the Coriolis frames 9, 9 are displaced in a direction of the accelerations being applied. In this case, the Coriolis frames 9 are vibrated along the first principal plane of the basement layer 2.

Detection frames 10, 10 of each sensor unit SUA1, SUA2 are arranged to vibrate in the same phase and with the same amplitude as those of vibrations in the detection direction (the second direction X) of the Coriolis frames 9, 9 of each of the sensor units SUA1, SUA2. The displacements thereof are detected as accelerations or angular rates by detection means 11, 11 of each of the sensor units SUA1, SUA2. Also in this case, the detection frames 10 are vibrated along the first principal plane of the basement layer 2.

The detection frames 10, 10 of each sensor unit SUA1, SUA2 are connected to a central support 15e via beams 13d, 13d. These beams 13d, 13d function to connect the detection frames 10, 10 to the basement layer 2 such that the detection frames 10, 10 of the each of the sensor units SUA1, SUA2 are not affected by vibrations in the driving direction (the first direction Y) of the Coriolis frames 9, 9 of respective sensor units SUA1, SUA2. On the other hand, each of the beams 13d, 13d are designed and disposed so as to displace flexibly in the detection direction (the second direction X). Each of the beams 13d, 13d provides connection between the detection frames 10, 10 to the basement layer 2, for example, in a linear and simple structure as in the first to third embodiments. Therefore, a resonance frequency in the detection direction (the second direction X) can be easily changed. In addition, it is possible to obtain the similar advantages as described in the first embodiment.

The above-mentioned support 15e is disposed at one point between both of the sensor units SUA1, SUA2 on the first principal plane of the basement layer 2, and fixes the above-mentioned beams 13d, 13d to the basement layer 2. Furthermore, the support 15e functions as an electrode providing electrical signals to movable electrodes 11a, 11b of detection means 11, 11 located at the detection frames 10, 10 of each of the sensor units SUA1, SUA2. Herein, the support 15e is formed of a laminated pattern of an active layer 2c and an insulating layer 2b as described in the first embodiment, and is connected to a support basement layer 2a and fixed to the basement layer 2. The support 15e is not necessarily fixed to the basement layer 2, but may be located in the suspended state over the first principal plane of the basement layer 2. In this case, electrical signals to the movable electrodes 11a, 11b of the above-mentioned detection means 11, 11 can be provided using above-described supports 15a. Whereby, connection points between each of the sensor units SUA1, SUA2, and the basement layer 2 can be decreased, so that it is possible to reduce the leakage of vibration, and to improve sensitivity of an inertial sensor 1C.

The electrostatic capacities of detection means 11, 11 of each sensor unit SUA1, SUA2 are varied in inverted phases with angular rates, and varied in the same phases with accelerations. Thus, an angular rate can be detected by subtraction of the electrostatic capacities of detection means 11, 11 of each of the sensor units SUA1, SUA2, and acceleration can be detected by addition of the electrostatic capacities in a distinguished manner respectively.

Note that, although in the above-mentioned descriptions, the case where sensor units described in the first embodiment are located side-by-side, it is not limited to this case. For example, the sensor units described in the second and third embodiments may be located as mentioned above.

Figure 10:
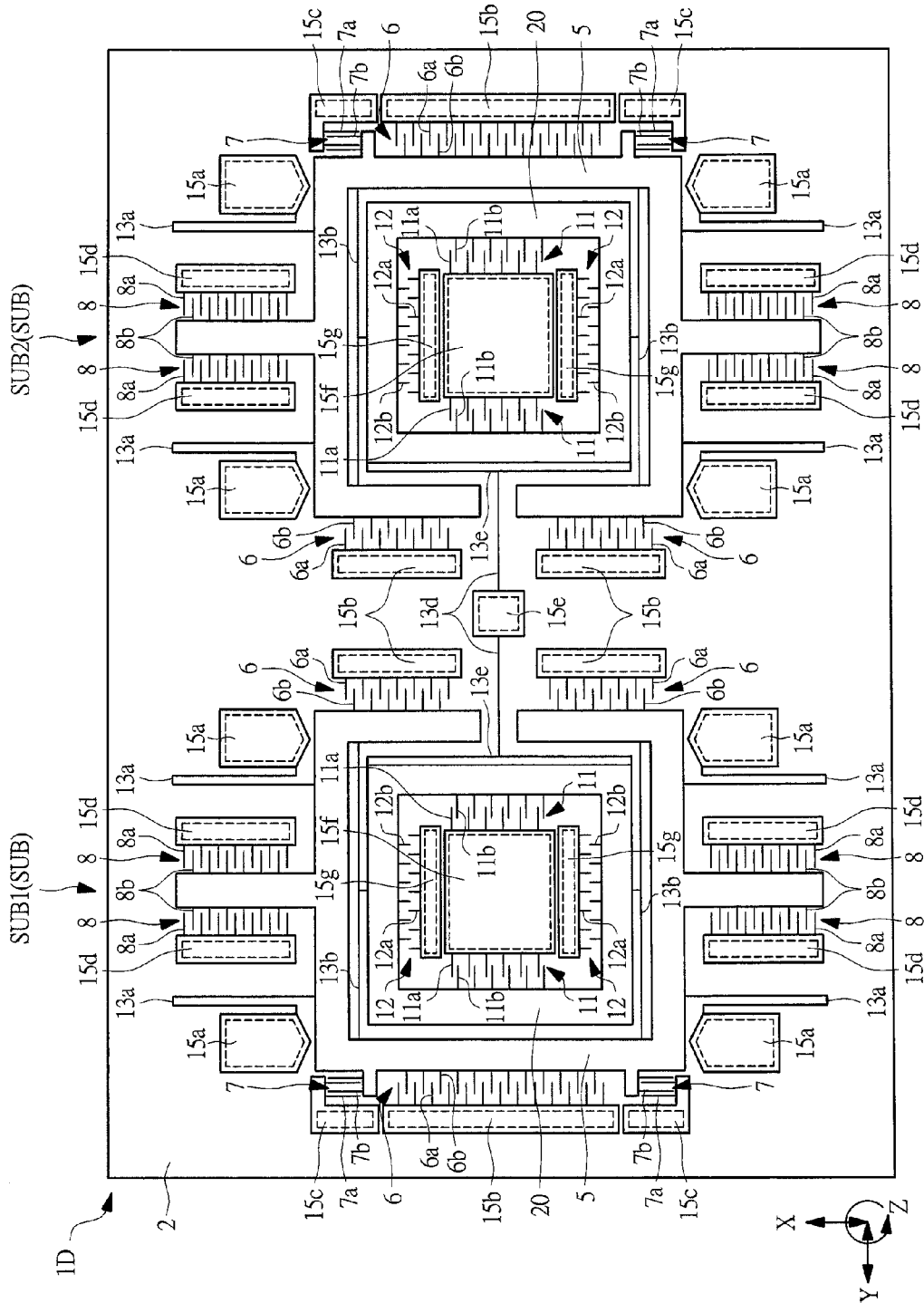
FIG. 10 is a plan view showing one example of an inertial sensor according to another embodiment of the present invention.

FIG. 10 shows a plan view of one example of an inertial sensor 1D in the case where two sensor units (SUB1, SUB2) described in the second embodiment are located side-by-side. Moreover, in FIG. 10, to facilitate visualization of the drawing, illustrations of an external wall W and a sealing cap MCP are omitted.

The inertial sensor 1D includes two sensor units SUB (SUB1, SUB2). The layout of these sensor units SUB1, SUB2 is the same as that of the sensor units SUA1, SUA2 shown in the above-mentioned FIG. 8. Furthermore, as is described in the above-mentioned FIG. 8, these two sensor units SUB1, SUB2 are arranged to vibrate in inverted phases each other. Whereby, it is possible to achieve a stable vibration, and to effectively utilize excitation energy.

Embodiment 5

According to a fifth embodiment, a construction in which two sets of sensor units are located so as to be orthogonal to each other on the first principal plane of the same basement layer is described.

Figure 11:
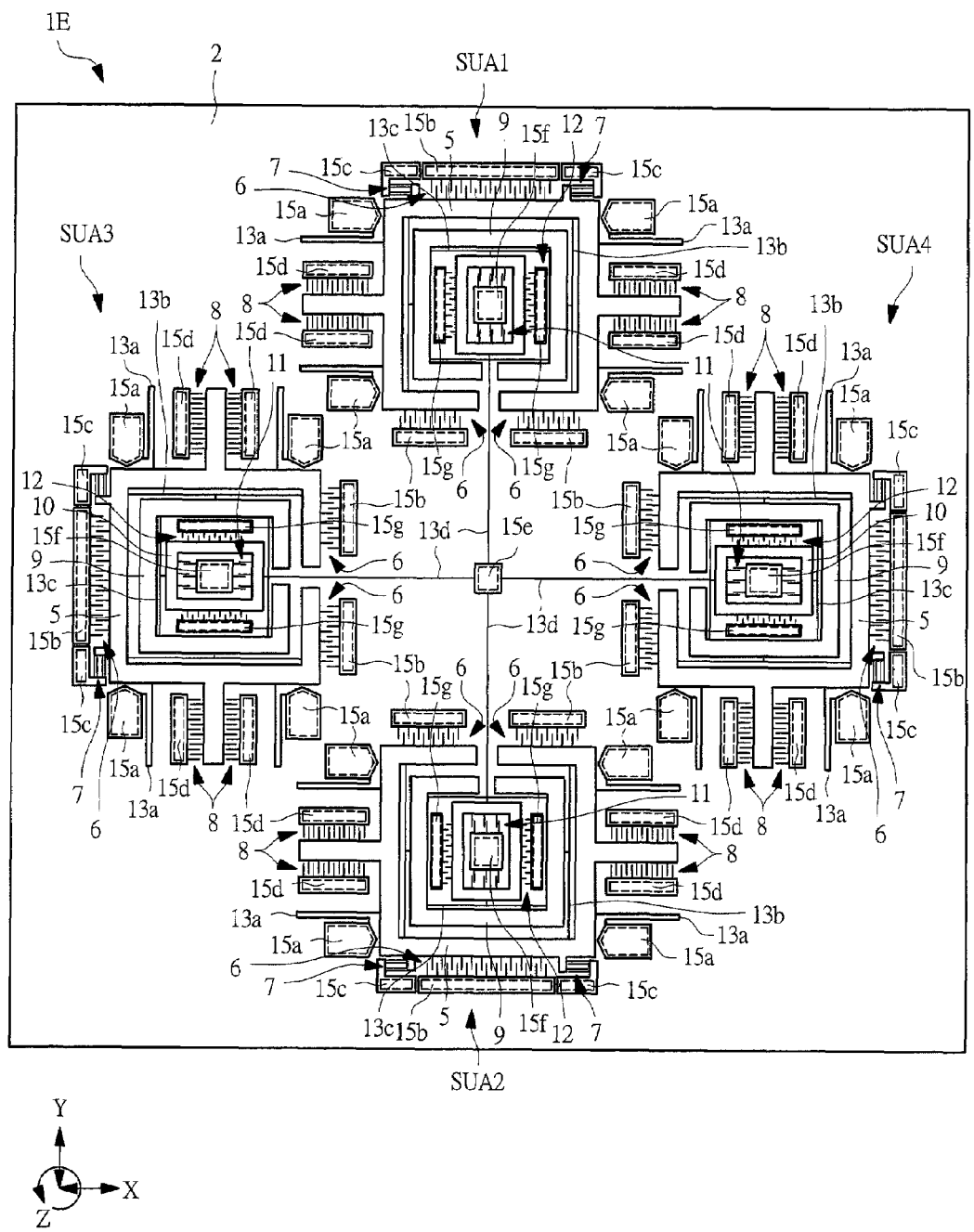
FIG. 11 is a plan view showing one example of an inertial sensor according to another embodiment according to the present invention.

FIG. 11 shows a plan view of one example of an inertial sensor 1E according to the fifth embodiment. Furthermore, in FIG. 11, to facilitate visualization of the drawing, illustrations of an external wall W and a sealing cap MCP are omitted.

The inertial sensor 1E according to the fifth embodiment includes four sensor units SUA (SUA1, SUA2, SUA3, SUA4).

On the first principal plane of the basement layer 2, one set of sensor units (a first sensor unit) SUA1, SUA2 and the other set of sensor units (a second sensor unit) SUA3, SUA4 are located so as to be orthogonal to each other. These four sensor units SUA1, SUA2, SUA3, SUA4 are disposed symmetrically with respect to a point on both top and bottom, left and right centering around one point of a support 15e. That is, one set of the sensor units SUA1, SUA2, on the first principal plane of the same basement layer 2, on a first axis extending in a first direction Y are disposed aligning symmetrically on top and bottom with respect to the support 15e on the first axis thereof. The other set of the sensor units SUA3, SUA4, on the first principal plane of the same basement layer 2, on a second axis extending in a second direction X are disposed aligning symmetrically on left and right with respect to the support 15e on the second axis thereof centered about. Whereby, according to this fifth embodiment, angular rates about one axis can be measured, as well as accelerations on two axes in plane can be measured.

Moreover, also in the fifth embodiment, drive frames 5, 5 of one set of the sensor units SUA1, SUA2 are arranged to vibrate in inverted phases each other; and drive frames 5, 5 of the other set of the sensor units SUA3, SUA4 are also arranged to vibrate in inverted phases each other. Additionally, in the fifth embodiment, the drive frames 5, 5 of one set of the sensor units SUA1, SUA2 and the drive frames 5, 5 of the other set of the sensor units SUA3, SUA4 are arranged to operate in synchronization in the state in which phases are shifted by 90 degrees. That is, when the drive frames 5, 5 of two sensor units SUA1, SUA2 disposed aligning along the first direction Y are moved in a direction to get closer to each other, the drive frames of two sensor units SUA3, SUA4 disposed aligning along the second direction X are arranged to move in a direction to move away from each other. When the drive frames 5, 5 of two sensor units SUA1, SUA2 disposed aligning along the first direction Y are moved in a direction to move away from each other, the drive frames 5, 5 of two sensor units SUA3, SUA4 disposed aligning along the second direction X are arranged to move in a direction to get closer to each other.

In the case of the fourth embodiment, although the leakage of vibration in the first direction Y can be reduced or prevented, a sufficient consideration is not taken in respect to the leakage of vibration that is generated by operation in the second direction X orthogonal to the first direction Y by Coriolis force, and thus the case where the effective utilization of excitation energy is insufficient arises. On the contrary, in the fifth embodiment, the leakage of vibration by operations not only in the first direction Y but also in the second direction X orthogonal thereto can be reduced and prevented, so that it is possible to achieve a more stable vibration, and thus to utilize more excitation energy effectively. Note that, in the case of the fifth embodiment, a driving direction is the first direction Y, and a detection direction is the second direction X in the sensor units SUA1, SUA2; and a driving direction is the second direction X and a detection direction is the first direction Y in the sensor units SUA3, SUA4.

The above-mentioned operations are controlled with driving means 6 of each sensor unit SUA1, SUA2, SUA3, SUA4. That is, drive frames 5 of each of the sensor units SUA1, SUA2, SUA3, SUA4 are vibrated as mentioned below by driving means 6. That is, when the drive frames 5, 5 of two sensor units SUA1, SUA2 get close to each other, two sensor units SUA3, SUA4 are vibrated so as to be apart from each other. When the drive frames 5, 5 of two sensor units SUA1, SUA2 get apart from each other, two sensor units SUA3, SUA4 are vibrated so as to be close to each other. Also in this case, the drive frames 5 are vibrated along the first principal plane of the basement layer 2.

Coriolis frames 9 of each sensor unit SUA1, SUA2, SUA3, SUA4 operate in conjunction with the drive frames 5 of respective sensor units SUA1, SUA2, SUA3, SUA4, and vibrate in the same phases as well as with the same amplitudes as those of respective drive frames 5 connected thereto. When angular rates are applied about Z-axis, the Coriolis frames are arranged to vibrate in a direction orthogonal to the driving direction by Coriolis force. Also in this case, the Coriolis frames 9 are vibrated along the first principal plane of the basement layer 2.

Detection frames 10 of each sensor unit SUA1, SUA2, SUA3, SUA4 are connected to a central support 15e via respective four beams 13d. Each of these beams 13d functions to connect each of the detection frames 10 to the basement layer 2 so that the detection frames 10 of each of the sensor units SUA1, SUA2, SUA3, SUA4 are not affected by vibrations in driving directions of the Coriolis frames 9 of respective sensor units SUA1, SUA2, SUA3, SUA4. At the same time, each of the beams 13d is designed and disposed so as to displace flexibly in detection directions. Each of the beams 13d, as in the first to fourth embodiments, connects four detection frames 10 to the basement layer 2, for example, in a linear and simple structure. Therefore, resonance frequencies in detection directions can be easily changed. Also in this case, the detection frames 10 are vibrated along the first principal plane of the basement layer 2. Furthermore, the same advantages as are described in the first embodiment can be obtained.

The above-mentioned support 15e is located on the first principal plane of the basement layer 2, and acts to fix four beams 13d to the basement layer 2. This support 15e is disposed at one point where the first axis and the second axis are intersected on which four sensor units SUA1, SUA2, SUA3, SUA4 are located, and is the center of rotation of the detection frames of four sensor units SUA1, SUA2, SUA3, SUA4. Further, since all exciting forces and Coriolis forces that act on the support 15e are cancelled each other, the support 15e is a stationary point that is not displaced by the exciting forces or Coriolis forces. Herein, the support 15e is formed of a laminated pattern of an active layer 2c and an insulating layer 2b as described in the first embodiment, and connected to the support basement layer 2a to be fixed to the basement layer 2. The support 15e, however, is not necessarily fixed to the basement layer 2, but may be located in the suspended state over the first principal plane of the basement layer 2. Whereby, connection points between each of the sensor units SUA1, SUA2 and the basement layer 2 can be reduced, so that it is possible to reduce the leakage of vibration, and to improve sensitivity of the inertial sensor 1E.

In addition, the support 15e comes to be an inflection point when accelerations are applied from outside of the inertial sensor 1E. Further, the support 15e, when the support 15e is fixed to the basement layer 2, functions as an electrode of providing electrical signals to movable electrodes 11a of detection means 11 that is disposed at the detection frame 10 of each sensor unit SUA1, SUA2, SUA3, SUA4.

Figure 12:
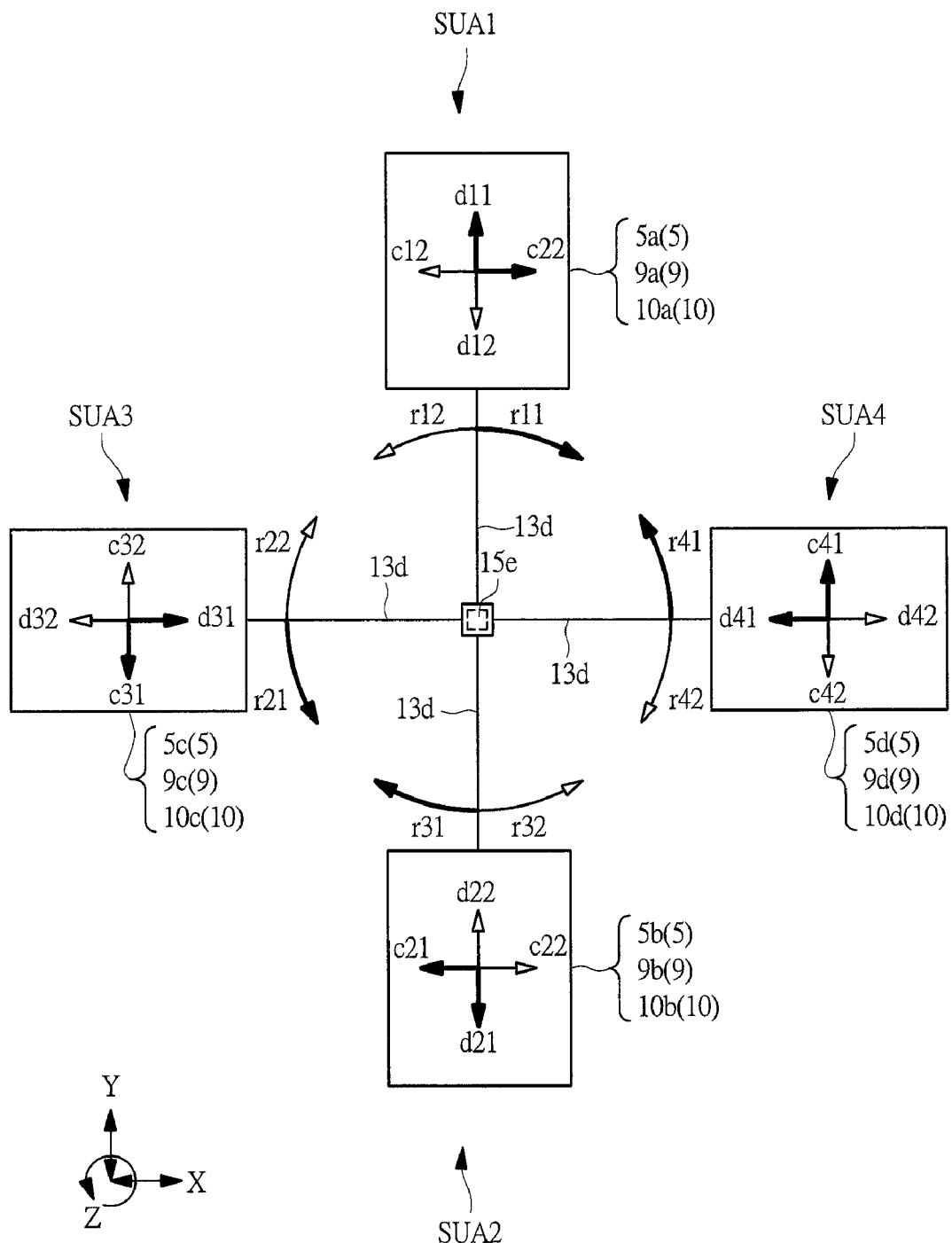
FIG. 12 is an explanatory diagram for describing operation of the inertial sensor shown in FIG. 11.

Now, operations of drive frames 5 and Coriolis frames 9 of the inertial sensor 1E according to the fifth embodiment are described referring to FIG. 12. Furthermore, with reference to FIG. 12, for reasons of convenience, descriptions are made letting: the drive frames 5 of the sensor units SUA1, SUA2, SUA3, SUA4 the drive frames 5a, 5b, 5c, 5d in order; the Coriolis frames 9 of the sensor units SUA1, SUA2, SUA3, SUA4 the Coriolis frames 9a, 9b, 9c, 9d in order; and the detection frames 10 of the sensor units SUA1, SUA2, SUA3, SUA4 the detection frames 10a, 10b, 10c, 10d in order.

When the drive frame 5a of the above-mentioned sensor unit SUA1 is displaced in d11 direction, the drive frame 5b is displaced in d21 direction, the drive frame 5c is displaced in d31 direction, and the drive frame 5d is displaced in d41 direction, by application of an angular rate in a counter-clockwise direction about z-axis, the Coriolis frames 9a, 9b, 9c, 9d are displaced in directions c11, c21, c31, c41 respectively. Meanwhile, the Coriolis frames 9a, 9b are displaced in directions c11, c22 respectively by application of acceleration in a positive (+) direction of the second direction X, and the Coriolis frames 9a, 9b are displaced in directions c12, c21 respectively by application of acceleration in a negative (−) direction of the second direction X. Furthermore, the Coriolis frames 9c, 9d are displaced in directions c32, c41 by application of acceleration in a positive (+) direction of the first direction Y, and the Coriolis frames 9c, 9d are displaced in directions c31, c42 respectively by application of acceleration in a negative (−) direction of the first direction Y. In addition, the Coriolis frames 9a, 9b, 9c, 9d are displaced in directions c12, c22, c32, c42 by application of a clockwise angular rate, and displaced in the opposite direction by application of a counter-clockwise angular acceleration.

The detection frames 10a, 10b, 10c, 10d are vibrated in the same phases as well as with the same amplitudes as those of vibration in the detection direction of the Coriolis frames 9a, 9b, 9c, 9d. The displacements are detected by detection means 11 of each sensor unit SUA1, SUA2, SUA3, SUA4. Furthermore, by comparing output signals from each detection means 11 of each of the sensor units SUA1 to SUA4, it is possible to detect accelerations to be applied in the first direction Y (the first axis) and the second direction X (the second axis), and, angular rates and angular accelerations to be applied in the third direction Z (about the third axis) in the first principal plane of the basement layer 2.

Now, the measurement principle of angular rates is described in detail. Since the above-mentioned detection frames 10a, 10b, 10c, 10d are connected to the basement layer 2 with the support 15e acting as an joint via respective beams 13d, they rotate about the support 15e by application of angular rates or angular accelerations. That is, as shown in FIG. 12, by angular rates, at a certain moment, the Coriolis frames 9a, 9b, 9c, 9d are moved rotationally like a pair of scissors in directions r11, r21, r31, r41, or r12, r22, r32, r42 respectively with respect to the support 15e. In the case where angular accelerations are applied, however, the detection frames 10a, 10b, 10c, 10d are rotated in the same direction. Therefore, angular rates and angular acceleration can be distinguished.

Moreover, since the Coriolis frames 9a, 9b, 9c, 9d and the detection frames 10a, 10b, 10c, 10d are rotationally vibrated like a pair of scissors, they are in structure of a tuning-fork, and thus rotational vibrations thereof are cancelled each other not to be leaked on the basement layer 2 side.

Like this, according to the fifth embodiment, a plurality of sensor units SUA1 to SUA4 having no vibration coupling in the driving direction and the detection direction orthogonal thereto are designed and disposed such that all the components are in fully tuning-fork structure. Whereby, vibration coupling in the driving direction and the detection direction, and the leakage (loss) of excitation energy and Coriolis force can be eliminated. Therefore, it is possible to improve stability of detection operation of the inertial sensor 1E. Furthermore, it is possible to improve detection sensitivity of the inertial sensor 1E. In addition, it is possible to improve reliability of detection values of the inertial sensor 1E. Accordingly, it is possible to provide the inertial sensor 1E of high stability, high sensitivity, and high reliability that is capable of detecting synchronously one-axis angular rates, one-axis angular accelerations, and two-axis accelerations.

Note that, although in the above-mentioned descriptions, the case where four sensor units SUA described in the first embodiment are apposed, it is not limited to this case. For example, the sensor units described in the second and third embodiments may be disposed as mentioned above.

Figure 13:
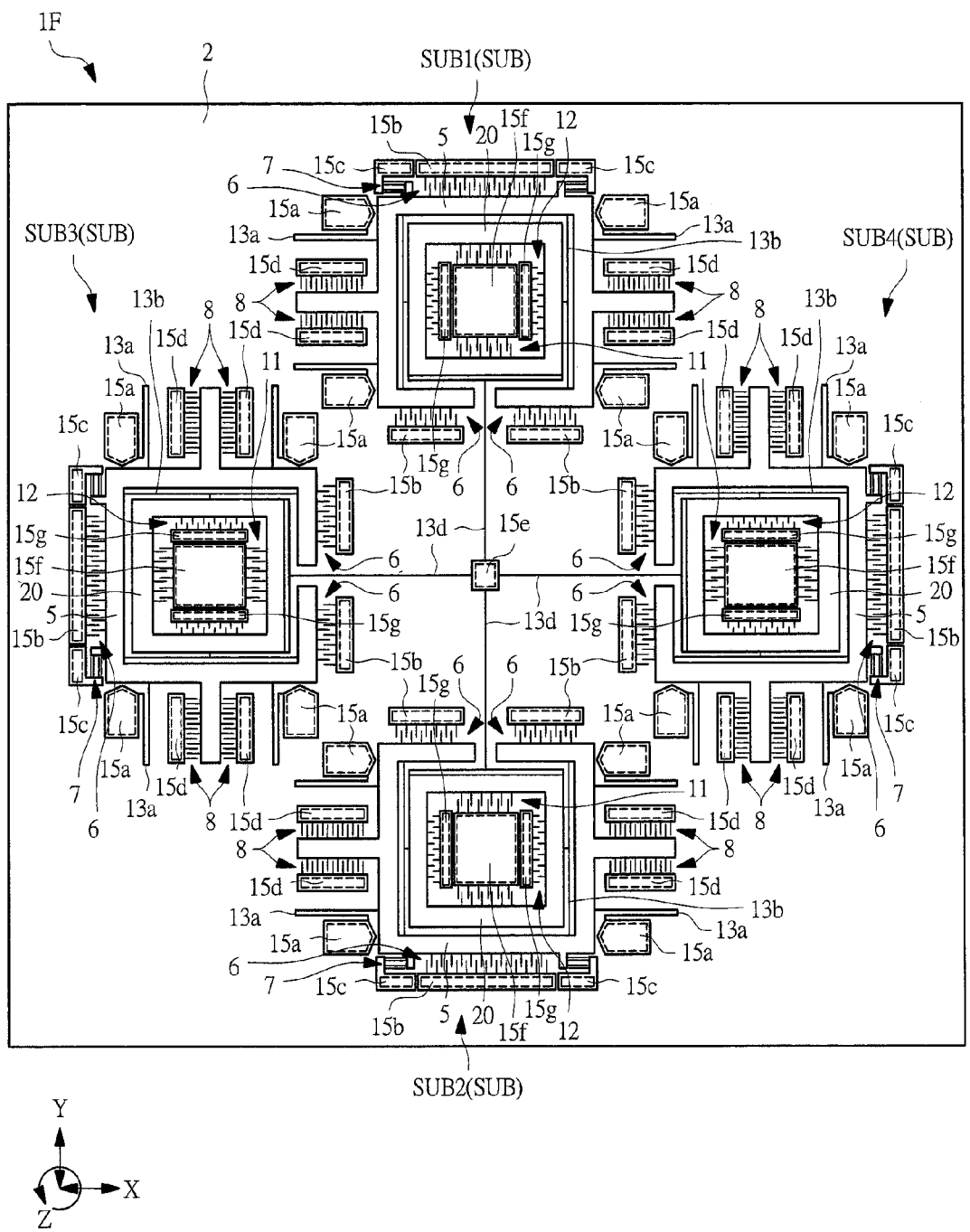
FIG. 13 is a plan view showing one example of an inertial sensor according to another embodiment of the present invention.

FIG. 13 shows a plan view of one example of an inertial sensor 1F in the case where the sensor units (SUB1, SUB2, SUB3, SUB4) described in the second embodiment are apposed. Further, in FIG. 13, to facilitate visualization of the drawing, illustrations of an external wall W and a sealing cap MCP are omitted.

The inertial sensor 1F includes two sets of sensor units SUB (SUB1, SUB2, SUB3, SUB4). The layout of these sensor units SUB1, SUB2, SUB3, SUB4 is the same as the layout of the sensor units SUB1, SUB2, SUB3, SUB4 shown in the above-mentioned FIG. 11. Further, operations of four sensor units SUB1, SUB2, SUB3, SUB4 is the same as the operations of the sensor units SUB1, SUB2, SUB3, SUB4 shown in the above-mentioned FIG. 11. Whereby, it is possible to achieve a stable vibration, and to effectively utilize excitation energy.

Embodiment 6

Figure 14:
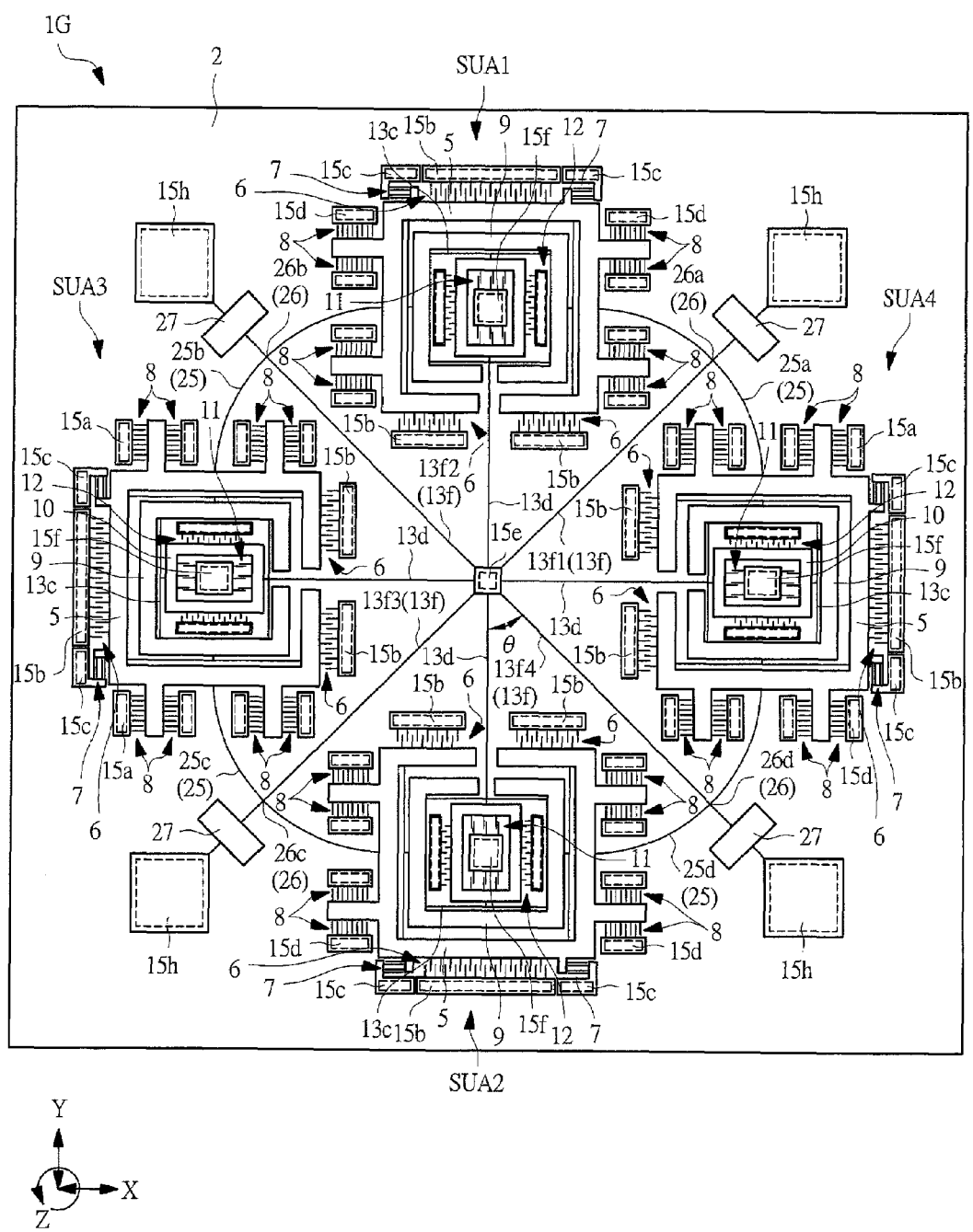
FIG. 14 is a plan view showing one example of an inertial sensor according to another embodiment of the present invention.
Figure 15:
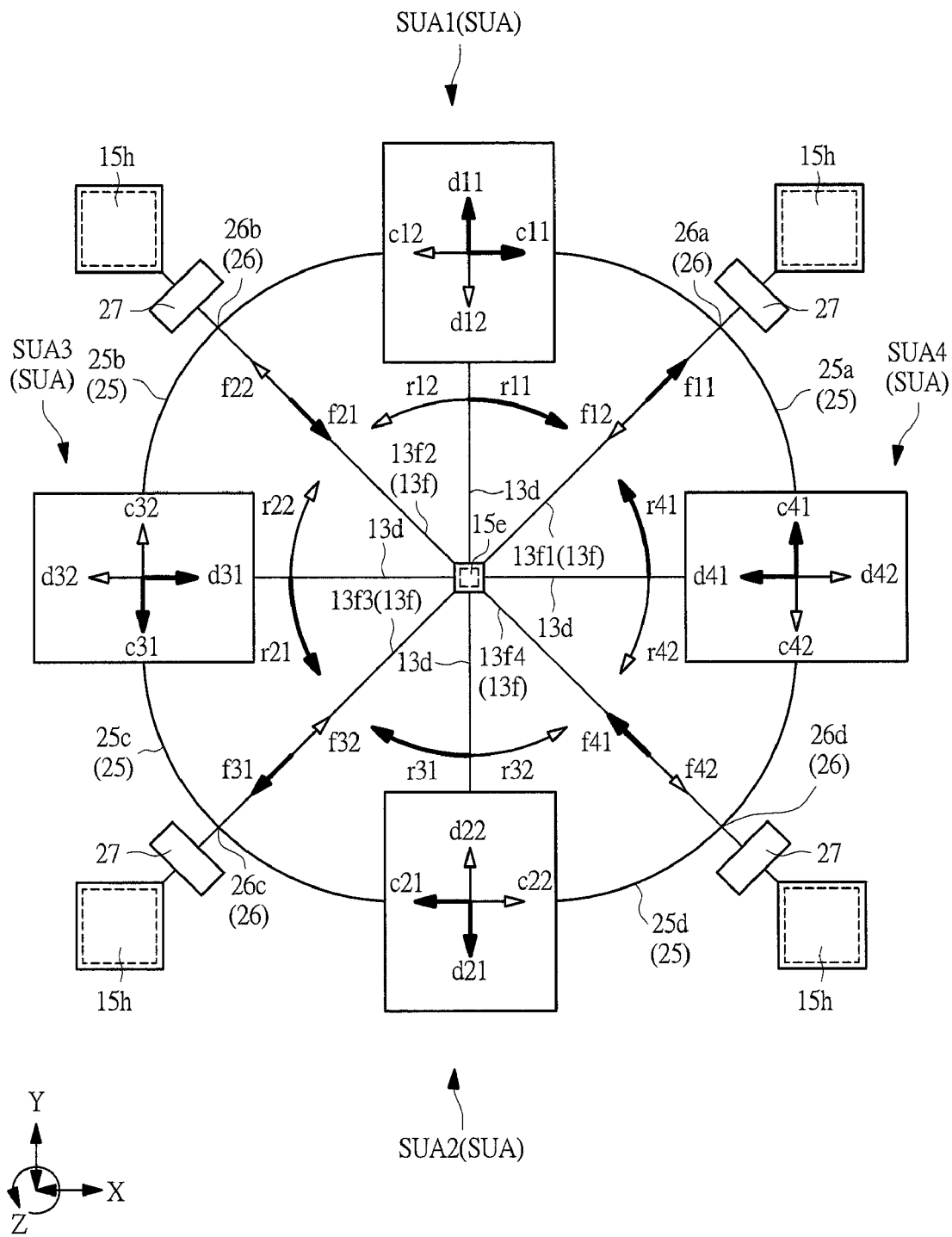
FIG. 15 is an explanatory diagram for describing operation of the inertial sensor shown in FIG. 14.

FIG. 14 shows a plan view of one example of an inertial sensor 1G according to a sixth embodiment. FIG. 15 shows an explanatory diagram of operations of the inertial sensor of FIG. 14. Further, in FIG. 14, to facilitate visualization of the drawing, illustrations of the above-mentioned external wall W and a sealing cap MCP are omitted. Moreover, in FIG. 15, operations of drive frames 5 and Coriolis frames 9 are the same as those described in FIG. 12, so that descriptions will be omitted.

On the first principal plane of the basement layer 2, as is the fifth embodiment, there are located four sensor units SUA1 to SUA4. According to the sixth embodiment, adjacent drive frames 5 of these four sensor units SUA1 to SUA4 are mechanically connected to each other with mechanical links (connection means) 25 (25a to 25d). That is, the mechanical link 25a provides connection between respective drive frames 5, 5 of the sensor units SUA1, SUA4, the mechanical link 25b provides connection between respective drive frames 5, 5 of the sensor units SUA1, SUA3, the mechanical link 25c provides connection between respective drive frames 5, 5 of the sensor units SUA3, SUA2, and the mechanical link 25d provides connection between respective drive frames 5, 5 of the sensor units SUA2, SUA4.

These mechanical links 25 are beams providing connection between four drive frames 5 of four sensor units SUA1 to SUA4, and function as a leaf spring. These mechanical links are formed by the above-mentioned active layer 2c being patterned finer than those of the above-mentioned drive frames 5 or detection frames 10. These mechanical links 25, with an insulating layer 2b being an under-layer thereof removed, are disposed in the suspended state over the first principal plane of the basement layer 2. Herein, although the case where one mechanical link 25 (25a to 25d) is disposed between adjacent drive frames 5, 5, it is not limited to this case. A plurality of mechanical link 25 may be disposed between adjacent drive frames 5, 5.

Also in the sixth embodiment, as described in the fifth embodiment, one set of sensor units SUA1, SUA2 and the other set of sensor units SUA3, SUA4 are arranged to operate in synchronization in the state where phases are shifted by 90 degrees. Although this operation can be achieved only with electrical signals with respect to driving means 6 as described in the fifth embodiment, due to fluctuations of processing, there are some cases where the size, the mass or the like of components of four sensor units SUA1 to SUA4 are subtly different, and thus above-mentioned phases are varied (that is, a phase difference cannot be 90 degrees).

Whereas, according to the sixth embodiment, by the provision of mechanical links 25, the synchronous operation in the state in which the above-mentioned phases of the above-mentioned four sensor units SUA1 to SUA4 are shifted by 90 degrees can be made partly by force. For example, when respective drive frames 5, 5 of the sensor units SUA1, SUA2 are moved in a direction of being apart from each other, the sensor units SUA3, SUA4 are pulled and moved in a direction of being close to each other by the mechanical links 25. On the contrary, when respective drive frames 5, 5 of the sensor units SUA1, SUA2 are moved in a direction to get closer to each other, the sensor units SUA3, SUA4 are pushed and moved in a direction to move apart from each other by the mechanical links 25. Owing to such construction, even if there are some errors in the size or the mass of respective components of the sensor units SUA1 to SUA4, it is possible to reduce or prevent the above-mentioned variation of the phases. Furthermore, principally, only by causing the driving means 6, 6 of the sensor units SUA1, SUA2 or the driving means 6, 6 of the sensor units SUA3, SUA4 to operate, the drive frames 5, 5, 5, 5 of the sensor units SUA1 to SUA4 can be vibrated. By operation of all the driving means 6, 6, 6, 6 of the sensor units SUA1 to SUA4, vibration of higher stability and with larger amplitudes can be obtained as a matter of course. Therefore, the tuning-fork action can be achieved more highly both in the first direction Y and the second direction X in the first principal plane of the basement layer 2, so that the leakage of vibration can be reduced or prevented, and thus excitation energy can be effectively utilized. Accordingly, it is possible to improve stability of the detection operation of the inertial sensor 1G. Further, it is possible to improve detection sensitivity of the inertial sensor 1G. In addition, it is possible to improve reliability of detection values of the inertial sensor 1G. That is, it is possible to obtain the inertial sensor 1G of higher performance.

Moreover, in the sixth embodiment, structural objects (sensor units) suspended over the first principal plane of the basement layer 2 are supported and fixed to the basement layer 2 with joints 26 (26a, 26b, 26c, 26d) being stationary points that are formed between respective adjacent drive frames 5 of each of the sensor units SUA1 to SUA4, and a support 15e.

The joints 26 (26a to 26d) are stationary points coming out on the above-mentioned mechanical links 25 (25a to 25d) when respective drive frames 5 of each of the sensor units SUA1 to SUA4 are displaced. Therefore, in case of the joints 26 (26a to 26d) being fixed to the basement layer 2, vibration coupling and the leakage of excitation energy can be prevented at the same time. Furthermore, since an unnecessary vibration energy comes hard to transmit from outside the inertial sensor 1G, a higher resistance with respect to disturbance can be achieved. Accordingly, it is possible to improve stability of detection operation of the inertial sensor 1G. Further, it is possible to improve detection sensitivity of the inertial sensor 1G. In addition, it is possible to improve reliability of detection values of the inertial sensor 1G. That is, it is possible to obtain the inertial sensor 1G of higher performance.

Furthermore, the joints 26 (26a to 26d) opposite to each other in an oblique direction with respect to the support 15e being a center point are connected to each other via beams 13f (13f1, 13f2, 13f3, 13f4) and the support 15e. That is, the joint 26a and the joint 26c are connected to each other via the beam 13f1, the support 15e, and the beam 13f3. Further, the joint 26b and the joint 26d are connected to each other via the beam 13f2, the support 15e, and the beam 13f4.

These beams 13f are members providing connection between the joints 26 (26a to 26d) as mentioned above, and are disposed to run on the lines of action of a compressive stress and a tensile stress. Further, the beams 13f are made of an active layer 2c patterned integrally with the active layer 2c of the joints 26 (26a to 26d). These beams 13f, with an insulating layer 2b being an under-layer thereof removed, are disposed in the suspended state over the first principal plane of the basement layer 2.

Although the above-mentioned joints 26 (26a to 26d) are stationary points with respect to drive vibration as mentioned above, as shown in FIG. 15, expanded or contracted forces are acted with respect to the support 15e by synthesized forces f11, f12, f21, f22, f31, f32, f41, f42 acting on Coriolis frames 9a, 9b, 9c, 9d. These forces are leaked to the basement layer 2 side trough the joints 26 (26a to 26d) as the loss of Coriolis forces. Therefore, according to the sixth embodiment, due to that the joints 26 (26a to 26d) are connected to each other as mentioned above with the beams 13f (13f1 to 13f4), the synthesized forces of Coriolis forces are canceled in the beams 13f (13f1 to 13f4) running on the lines of action of stresses. That is, synthesized components of Coriolis forces acting on the joints 26 (26a to 26d) and stresses generated due to deformation of above-described basement layer 2 can be cancelled each other in the beams 13f (13f1 to 13f4), the loss of Coriolis forces can be prevented. Accordingly, it is possible to improve stability of detection operation of the inertial sensor 1G. Further, it is possible to improve detection sensitivity of the inertial sensor 1G. In addition, it is possible to improve reliability of detection values of the inertial sensor 1G. That is, it is possible to obtain the inertial sensor 1G of further higher performance.

Further, according to the sixth embodiment, each joint (26a to 26d) and each support 15h are connected together with a beam via a stress-absorbing spring 27 therebetween. With these stress-absorbing springs 27, deformation of the basement layer 2 due to the change of temperatures around the inertial sensor 1G can be absorbed, so that adverse effects to the characteristics of the sensor or disconnection of the beams 13f can be reduced or prevented. Therefore, spring constants of the mechanical links 25a to 25d are not affected. Further, stresses collected at each of the stress-absorbing springs 27 are cancelled in respective beams 13d connected to each thereof.

Such stress-absorbing springs 27 are formed by an active layer 2c formed integrally with the active layer 2c of the joints 26 (26a to 26d) being processed in desired configurations. These stress-absorbing springs 27, with insulating layer 2b, being under-layer thereof removed, are in the suspended state over the first principal plane of the basement layer 2. However, the stress-absorbing springs 27 may be absent in the case where stresses to act on the joints 26 (26a to 26d) can be ignored.

The above-mentioned supports 15h are disposed on extended lines outward of the beams 13f between adjacent sensor units of four sensor units SUA1 to SUA4. These supports 15h are formed of a laminated pattern of the above-mentioned active layer 2c and the above-mentioned insulating layer 2b, and is firmly joined and fixed to the support basement layer 2a of the basement layer 2.

Other constructions or advantages are the same as are described in the fifth embodiment.

However, in the above-mentioned descriptions, although the case where four sensor units SUA described in the first embodiment are apposed is described, it is not limited to this case. For example, the sensor units described in the second and third embodiments may be disposed as mentioned above.

Figure 16:
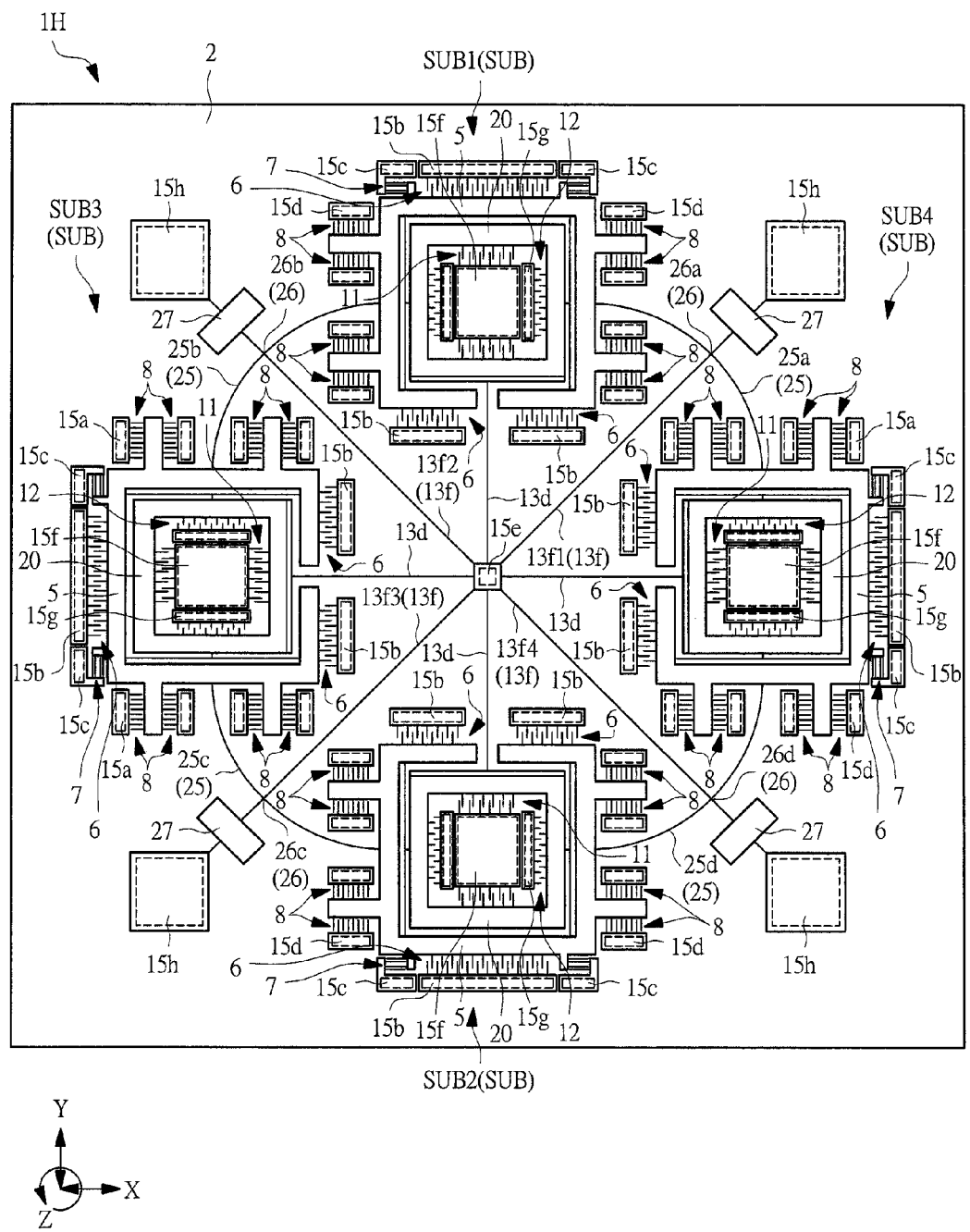
FIG. 16 is a plan view showing one example of an inertial sensor according to another embodiment of the present invention.

FIG. 16 shows a plan view of one example of an inertial sensor 1H in the case where four sensor units SUB (SUB1, SUB2, SUB3, SUB4) described in the second embodiment are apposed. Further, in FIG. 16, to facilitate visualization of the drawing, an external wall W and a sealing cap MCP are omitted to illustrate.

The inertial sensor 1H includes two sets of sensor units SUB (SUB1, SUB2, SUB3, SUB4). The layout of these sensor units SUB1, SUB2, SUB3, SUB4 are the same as the layout of the sensor units SUA1, SUA2, SUA3, SUA4 shown in the above-mentioned FIG. 14. Moreover, operations of the sensor units SUB1, SUB2, SUB3, SUB4 are the same as operations of the sensor units SUA1, SUA2, SUA3, SUA4 shown in the above-mentioned FIG. 14. Whereby, a stable vibration can be achieved, and excitation energy can be effectively utilized.

Figure 17:
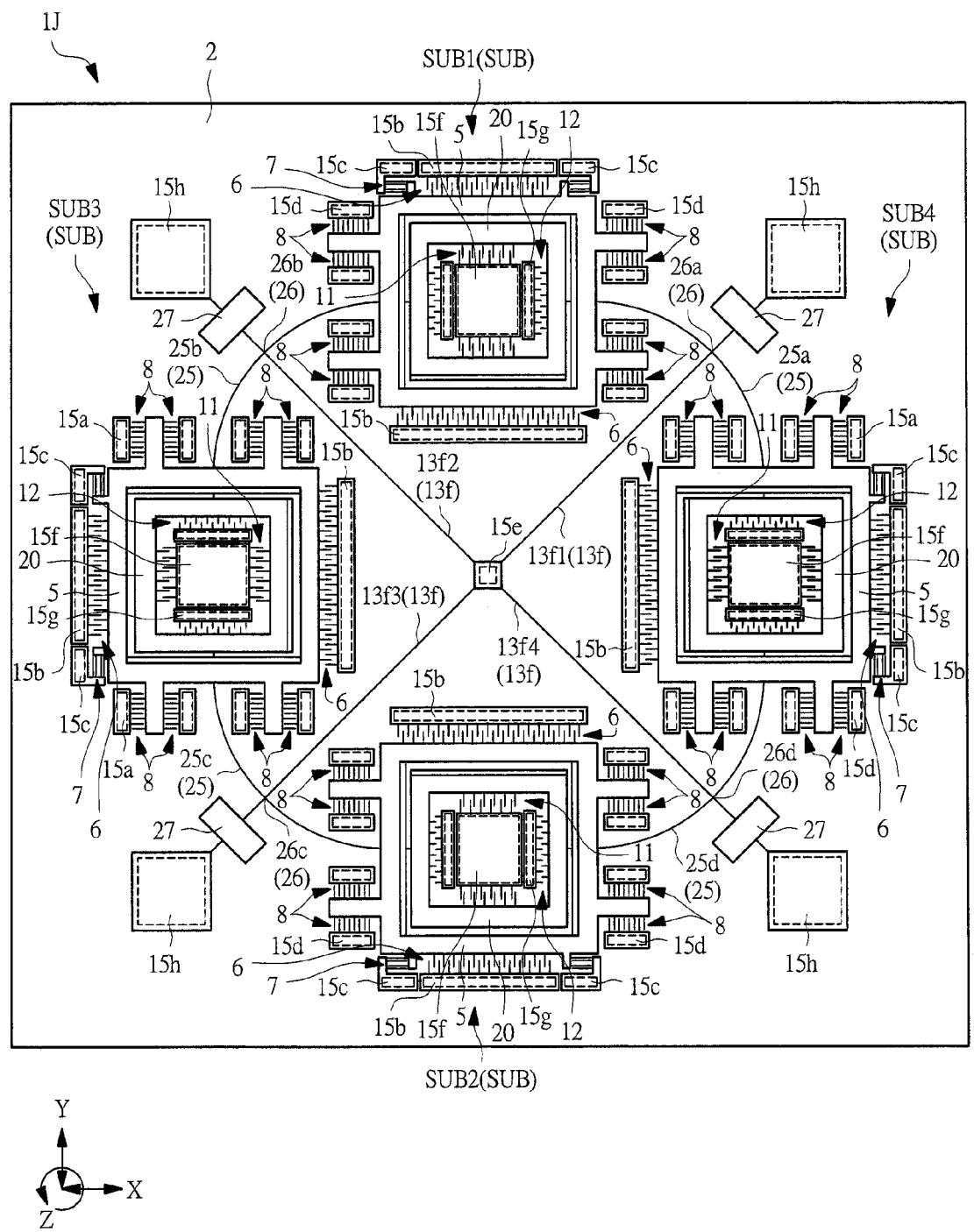
FIG. 17 is a plan view showing one example of an inertial sensor according to another embodiment of the present invention.

In the embodiment of FIG. 16, however, there may be no four beams 13d connected to respective elements 20 of each of the sensor units SUB1 to SUB4. FIG. 17 shows one example of an inertial sensor 1J in this case. In this inertial sensor 1J, the beams 13d shown in FIG. 16 are not resided, and drive frames 5 of each of the sensor units SUB1 to SUB4 are supported by mechanical links 25a to 25d. Due to that the beams 13d are eliminated like this, the unit cells SUB1 to SUB4 can be easy to form.

Embodiment 7

According to a seventh embodiment, application examples of inertial sensors 1 (1A to 1H, 1J) according to the first to sixth embodiments will be described.

Figure 18:
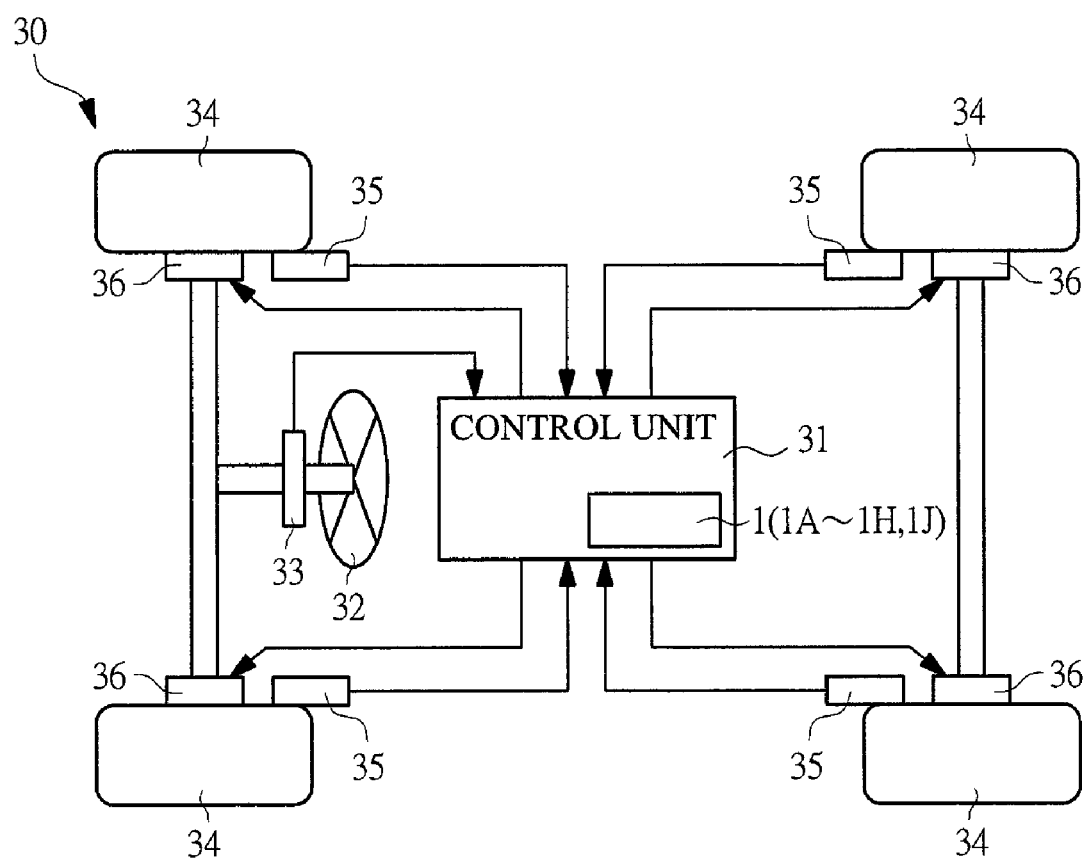
FIG. 18 is an explanatory diagram of an application example of an inertial sensor according to one embodiment of the present invention.
Figure 19:
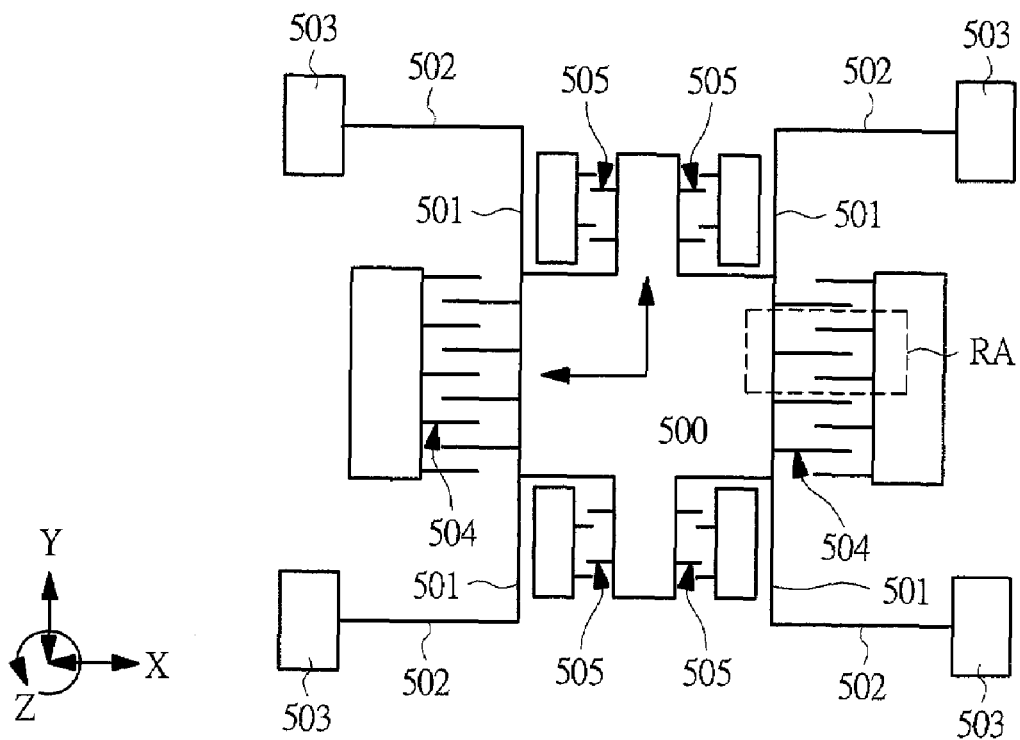
FIG. 19 is an explanatory diagram of one example of an inertial sensor which the present inventors takes into consideration.
Figure 20:
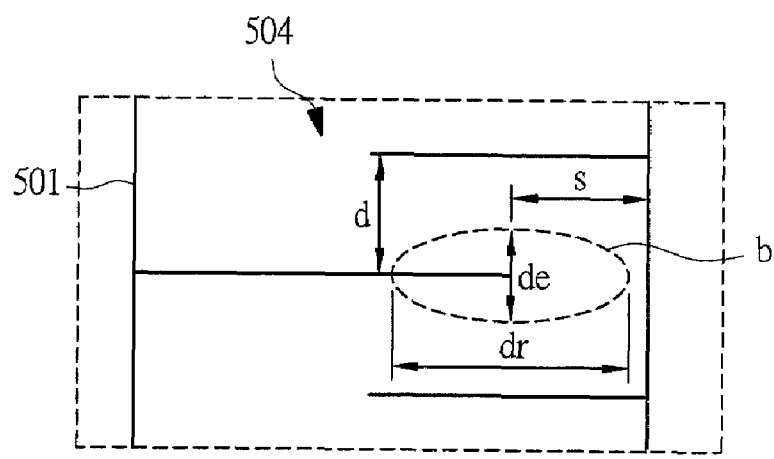
FIG. 20 is an enlarged view of a region RA in driving means of the inertial sensor shown in FIG. 19.

FIG. 18 shows one example of the case where an inertial sensor 1 is applied to an antiskid brake system for automobiles. A reference numeral 30 designates a vehicle, a reference numeral 31 designates a control unit, a reference numeral 32 designates a steering wheel a driver operates, a reference numeral 33 designates a steering angle sensor detecting manipulated variable of the steering wheel 32, a reference numeral 34 designates a tire, a reference numeral 35 designates a rotation sensor detecting rotational speed of each tire, and a reference numeral 36 designates a brake.

First, the driver of the vehicle 30 operates the steering wheel 32 in order to steer the vehicle to an intended direction. Then, manipulated variables thereof are detected with the steering angle sensor 33, and detection signals thereof are input to the control unit 31. Furthermore, the speed of the vehicle 30 is detected with the rotation sensor 35, and detection signals thereof are input to the control unit 31. Herein, when the vehicle skids on snowy roads and begins to spin against the intention of a driver, the control unit 31 detects a difference between the movement (angular rate and acceleration) of the vehicle 30 that is calculated with the manipulated variable of the steering wheel 32 and the speed of the vehicle and the movement (angular rate and acceleration) of the vehicle 30 that is detected from the inertial sensor 1 according to the embodiments, and controls the brake 36 such that preventing skid to occur.

According to the present embodiment, it is possible to improve stability, sensibility, and reliability of the inertial sensor 1 as mentioned above, so that it is possible to make a further high-level control, and thus it is possible to lead a vehicle 30 to a more safe state.

In the foregoing, the invention made by the inventors of the present invention has been concretely described based on the embodiments. However, it is needless to say that the present invention is not limited to the foregoing embodiments and various modifications and alterations can be made within the scope of the present invention.

Although in the above description, the case in which the present invention made by the present inventors is applied mainly to an antiskid brake system for automobiles as a background application field thereof has been described, it is not limited to this case, but is variously applicable. The present invention may be applied to, for example, crash detectors of an airbag of automobiles or other systems of automobiles such as car navigation systems; as well as sensors of measuring the posture or movement state of a robot or posture recognizing sensors for mobile phones, or sensors for use in posture control for portable electronic devices including laptop personal computers and digital cameras such as hand shake correction, or drop detection for portable electronic devices.

The present invention can be applied to manufacturers of MEMS inertial sensors.

What is claimed is:

1. An inertial sensor comprising:
a basement layer including a first principal plane and a second principal plane that are positioned on sides opposite to each other in a thickness direction; and
a sensor unit located in the first principal plane of said basement layer,
said sensor unit comprising:
a drive frame disposed apart from said basement layer on the first principal plane of said basement layer;
a driving means for causing said drive frame to vibrate in a driving direction;
a Coriolis frame that is connected to said drive frame in the state of being disposed apart from said basement layer on said first principal plane of said basement layer, and that is vibrated in the driving direction with the same amplitude and in the same phase as those of the vibration of said drive frame, as well as vibrated by Coriolis force in a detection direction intersecting with said driving direction;
a detection frame that is connected to said Coriolis frame in the state of being disposed apart from said basement layer on said first principal plane of said basement layer, and is vibrated in the detection direction with the same amplitude and in the same phase of those of the vibration in the detection direction of said Coriolis frame;
a beam that is disposed apart form said basement layer on said first principal plane of said basement layer, and that fixes said detection frame to said basement layer so as not to be affected by the vibration in the driving direction of said Coriolis frame, and so as to follow the vibration in the detection direction of said Coriolis frame; and
a detection means for detecting the vibration in a detection direction of said detection frame as an applied angular rate;
wherein said detection frame is connected to a support disposed outside of said sensor unit via said beam and fixed to said basement layer.

2. The inertial sensor according to claim 1,
wherein said driving means is formed of an electrostatic comb-typed drive unit.

3. The inertial sensor according to claim 1,
wherein said detection means is formed of an electrostatic comb-typed detector.

4. The inertial sensor according to claim 1,
wherein said support is disposed on a first axis extending in a first direction on said first principal plane of said basement layer;
wherein said sensor unit includes two sensor units;
wherein said two sensor units are disposed so as to be symmetrical with respect to a point of said support on said first axis on said first principal plane of said basement layer; and
wherein said respective drive frames of said two sensor units are disposed so as to vibrate in inverted phases each other.

5. The inertial sensor according to claim 1,
wherein said support is disposed at an intersection of said first axis extending in the first direction on said first principal plane of said basement layer and a second axis extending in a second direction intersecting with said first axis;
wherein said sensor unit includes two first sensor units and two second sensor units;
wherein said two first sensor units are disposed symmetrically with respect to a point of said support on said first axis on said first principal plane of said basement layer;
wherein said respective drive frames of said two first sensor units are disposed so as to vibrate in inverted phase each other;
wherein the two second sensor units are disposed symmetrically about a point with respect to the support on the second axis on the first principal plane of the basement layer;
wherein said respective drive frames of said two second sensor units are disposed to vibrate in inverted phase each other; and
wherein said drive frames of said two first sensor units and the drive frames of said two second sensor units are disposed so as to operate in synchronization in the state in which phases are shifted by 90 degrees.

6. The inertial sensor according to claim 5,
wherein among said sensor units, drive frames of said first sensor unit and drive frames of said second sensor unit that are adjacent to each other are connected by a connection means.

7. The inertial sensor according to claim 6,
wherein a joint being a stationary point is located on said connection means.

8. The inertial sensor according to claim 7,
wherein said sensor unit is fixed to said basement layer with said joint and said support.

9. The inertial sensor according to claim 7,
wherein said joints opposed with respect to said support are connected to each other with a beam.

10. The inertial sensor according to claim 9,
wherein a support disposed outside of said connection means and said joint are connected with a spring interposed therebetween.

11. The inertial sensor according to claim 1,
wherein said sensor unit is made of a material selected from the group consisting of a conductive silicon, a conductive poly-silicon or a plated metal.

12. An inertial sensor comprising:

a basement layer including a first principal plane and a second principal plane that are positioned on sides opposite to each other in a thickness direction;

in said first principal plane of said basement layer, with cantering around an intersection of a first axis extending in a first direction and a second axis extending in a second direction intersecting with said first direction, two first sensor units disposed symmetrically about a point on said first axis and two second sensor units disposed symmetrically about a point on said second axis; and a support located outside of said two first sensor units and said two second sensor units, and disposed at the intersection of said first axis and said second axis;

each of said two first sensor units and said two second sensor units comprising:

a drive frame disposed apart from said basement layer on said first principal plane of said basement layer;

a driving means for causing said drive frame to vibrate in a driving direction;

a Coriolis frame that is connected to said drive frame in the state of being disposed apart from said basement layer on said first principal plane of said basement layer, and that is vibrated in the driving direction with the same amplitude and in the same phase as those of the vibration of said drive frame, as well as vibrated by Coriolis force in a detection direction intersected with respect to the driving direction;

a detection frame that is connected to said Coriolis frame in the state of being disposed apart from said basement layer on said first principal plane of said basement layer, and is vibrated in the detection direction with the same amplitude and in the same phase of those of the vibration in the detection direction of said Coriolis frame;

a beam that is disposed apart form said basement layer on said first principal plane of said basement layer, and that supports said detection frame so as not to be affected by the vibration in the driving direction of said Coriolis frame, and so as to follow the vibration in the detection direction of said Coriolis frame; and a detection means for detecting the vibration in the detection direction of said detection frame as an applied angular rate;

wherein said respective detection frames of said two first sensor units and said two second sensor units are connected to said support via said beam;

wherein said respective drive frames of said two first sensor units are disposed so as to vibrate in inverted phases each other;

wherein the respective drive frames of said two second sensor units are disposed so as to vibrate in inverted phases each other; and wherein said drive frames of said two first sensor units and said drive frames of said two second sensor units are disposed so as to operate in synchronization in the state in which phases are shifted by 90 degrees.

13. The inertial sensor according to claim 12, wherein among said two first sensor units and said two second sensor units, drive frames of said first sensor unit and drive frames of said second sensor unit that are adjacent to each other are connected by a connection means.

14. The inertial sensor according to claim 13, wherein said connection means functions to cause said respective drive frames of said two second sensor units to move in a direction to get closer when said respective drive frames of said two first sensor units are moved in a direction to be apart with, and to cause said respective drive frames of said two second sensor units to move in a direction to be apart with when said respective drive frames of said two first sensor units are moved in a direction to get closer.

15. The inertial sensor according to claim 12, wherein said support is fixed to said basement layer.

16. The inertial sensor according to claim 12, wherein said support is not fixed to said basement layer.

17. An inertial sensor comprising:

a basement layer including a first principal plane and a second principal plane that are positioned on sides opposite to each other in a thickness direction;

in said first principal plane of said basement layer, with cantering around an intersection of a first axis extending in a first direction and a second axis extending in a second direction intersecting with said first direction, two first sensor units disposed symmetrically about a point on said first axis and two second sensor units disposed symmetrically about a point on said second axis; and a support located outside of said two first sensor units and said two second sensor units, and disposed at the intersection of said first axis and said second axis;

each of said two first sensor units and said two second sensor units comprising:

a drive frame disposed apart from said basement layer on said first principal plane of said basement layer;

a driving means for causing said drive frame to vibrate in a driving direction;

a Coriolis frame that is connected to said drive frame in the state of being disposed apart from said basement layer on said first principal plane of said basement layer, and that is vibrated in the driving direction with the same amplitude and in the same phase as those of the vibration of said drive frame, as well as vibrated by Coriolis force in a detection direction intersected with respect to the driving direction;

a detection frame that is connected to said Coriolis frame in the state of being disposed apart from said basement layer on said first principal plane of said basement layer, and is vibrated in the detection direction with the same amplitude and in the same phase of those of the vibration in the detection direction of said Coriolis frame;

a beam that is disposed apart form said basement layer on said first principal plane of said basement layer, and that supports said detection frame so as not to be affected by the vibration in the driving direction of said Coriolis frame, and so as to follow the vibration in the detection direction of said Coriolis frame; and a detection means for detecting the vibration in the detection direction of said detection frame as an applied angular rate;

wherein said respective detection frames of said two first sensor units and said two second sensor units are connected to said support via said beam;

wherein among said two first sensor units and said two second sensor units, drive frames of said first sensor unit and drive frames of said second sensor unit that are adjacent to each other are connected by a connection means;

wherein said respective drive frames of said two first sensor units are disposed so as to vibrate in inverted phases each other;

wherein the respective drive frames of said two second sensor units are disposed so as to vibrate in inverted phases each other; and wherein said drive frames of said two first sensor units and said drive frames of said two second sensor units are disposed so as to operate in synchronization in the state in which phases are shifted by 90 degrees.

18. An inertial sensor comprising:

a basement layer including a first principal plane and a second principal plane that are positioned on sides opposite to each other in a thickness direction;

in said first principal plane of said basement layer, with cantering around an intersection of a first axis extending in a first direction and a second axis extending in a second direction intersecting with said first direction, two first sensor units disposed symmetrically about a point on said first axis and two second sensor units disposed symmetrically about a point on said second axis; and a support located outside of said two first sensor units and said two second sensor units, and disposed at the intersection of said first axis and said second axis;

each of said two first sensor units and said two second sensor units comprising:

a drive frame disposed apart from said basement layer on said first principal plane of said basement layer;

a driving means for causing said drive frame to vibrate in a driving direction;

a Coriolis frame that is connected to said drive frame in the state of being disposed apart from said basement layer on said first principal plane of said basement layer, and that is vibrated in the driving direction with the same amplitude and in the same phase as those of the vibration of said drive frame, as well as vibrated by Coriolis force in a detection direction intersected with respect to the driving direction;

a detection frame that is connected to said Coriolis frame in the state of being disposed apart from said basement layer on said first principal plane of said basement layer, and is vibrated in the detection direction with the same amplitude and in the same phase of those of the vibration in the detection direction of said Coriolis frame;

a beam that is disposed apart form said basement layer on said first principal plane of said basement layer, and that supports said detection frame so as not to be affected by the vibration in the driving direction of said Coriolis frame, and so as to follow the vibration in the detection direction of said Coriolis frame; and a detection means for detecting the vibration in the detection direction of said detection frame as an applied angular rate;

wherein said respective detection frames of said two first sensor units and said two second sensor units are connected to said support via said beam;

wherein among said two first sensor units and said two second sensor units, drive frames of said first sensor unit and drive frames of said second sensor unit that are adjacent to each other are connected by a connection means;

wherein a joint being a stationary point is disposed on said connection means;

wherein said joints opposed with respect to said support are connected to each other by a beam;

wherein said respective drive frames of said two first sensor units are disposed so as to vibrate in inverted phases each other;

wherein the respective drive frames of said two second sensor units are disposed so as to vibrate in inverted phases each other; and wherein said drive frames of said two first sensor units and said drive frames of said two second sensor units are disposed so as to operate in synchronization in the state in which phases are shifted by 90 degrees.

19. The inertial sensor according to claim 18, wherein said two first sensor units and said two second sensor units are fixed to said basement layer with said joint and said support.

20. An inertial sensor comprising:

a basement layer including a first principal plane and a second principal plane that are positioned on sides opposite to each other in a thickness direction;

in said first principal plane of said basement layer, with cantering around an intersection of a first axis extending in a first direction and a second axis extending in a second direction intersecting with said first direction, two first sensor units disposed symmetrically about a point on said first axis and two second sensor units disposed symmetrically about a point on said second axis; and a support located outside of said two first sensor units and said two second sensor units, and disposed at the intersection of said first axis and said second axis;

each of said two first sensor units and said two second sensor units comprising:

a drive frame disposed apart from said basement layer on said first principal plane of said basement layer;

a driving means for causing said drive frame to vibrate in a driving direction;

a Coriolis frame that is connected to said drive frame in the state of being disposed apart from said basement layer on said first principal plane of said basement layer, and that is vibrated in the driving direction with the same amplitude and in the same phase as those of the vibration of said drive frame, as well as vibrated by Coriolis force in a detection direction intersected with respect to the driving direction;

a detection frame that is connected to said Coriolis frame in the state of being disposed apart from said basement layer on said first principal plane of said basement layer, and is vibrated in the detection direction with the same amplitude and in the same phase of those of the vibration in the detection direction of said Coriolis frame;

a beam that is disposed apart form said basement layer on said first principal plane of said basement layer, and that supports said detection frame so as not to be affected by the vibration in the driving direction of said Coriolis frame, and so as to follow the vibration in the detection direction of said Coriolis frame; and a detection means for detecting the vibration in the detection direction of said detection frame as an applied angular rate;

wherein said respective detection frames of said two first sensor units and said two second sensor units are connected to said support via said beam;

wherein among said two first sensor units and said two second sensor units, drive frames of said first sensor unit and drive frames of said second sensor unit that are adjacent to each other are connected by a connection means;

wherein a joint being a stationary point is disposed on said connection means;

wherein said joints opposed with respect to said support are connected to each other by a beam;

wherein a support disposed more outward of the connection means and said joint are connected with a spring interposed therebetween;

wherein said respective drive frames of said two first sensor units are disposed so as to vibrate in inverted phases each other;

wherein the respective drive frames of said two second sensor units are disposed so as to vibrate in inverted phases each other; and wherein said drive frames of said two first sensor units and said drive frames of said two second sensor units are disposed so as to operate in synchronization in the state in which phases are shifted by 90 degrees.

* * * * *